(12) United States Patent
Yim et al.

(10) Patent No.: US 12,531,963 B2
(45) Date of Patent: Jan. 20, 2026

(54) WALL MOUNT DEVICE AND DISPLAY APPARATUS INCLUDING SAME

(71) Applicant: SAMSUNG ELECTRONICS CO., LTD., Suwon-si (KR)

(72) Inventors: Chanhyuck Yim, Suwon-si (KR); Jihye Min, Suwon-si (KR); Doyun Baek, Suwon-si (KR); Eric Lee, Suwon-si (KR); Sangki Yoon, Suwon-si (KR); Wookjin Lee, Suwon-si (KR); Yoseob Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/807,640

(22) Filed: Aug. 16, 2024

(65) Prior Publication Data

US 2024/0406342 A1   Dec. 5, 2024

Related U.S. Application Data

(63) Continuation of application No. PCT/KR2023/000216, filed on Jan. 5, 2023.

(30) Foreign Application Priority Data

Mar. 3, 2022   (KR) .................. 10-2022-0027668

(51) Int. Cl.
*H04N 5/655*   (2006.01)

(52) U.S. Cl.
CPC .................. *H04N 5/655* (2013.01)

(58) Field of Classification Search
None
See application file for complete search history.

(56) References Cited

U.S. PATENT DOCUMENTS

| 7,175,146 | B2 | 2/2007 | Kim |
| 8,740,164 | B2 | 6/2014 | Tachibana |
| 10,578,899 | B2 | 3/2020 | In et al. |

(Continued)

FOREIGN PATENT DOCUMENTS

| CN | 109630843 A | 4/2019 |
| CN | 110107790 A | 8/2019 |

(Continued)

OTHER PUBLICATIONS

Communication dated Mar. 19, 2025, issued in European Patent Office in European Patent Application No. 23763602.2.

(Continued)

*Primary Examiner* — Samuel D Fereja
(74) *Attorney, Agent, or Firm* — Sughrue Mion, PLLC

(57) ABSTRACT

A wall mount device is provided and may be configured to mount a display module, configured to display an image on a front surface of the display module, to a wall. The wall mount device may include: a wall bracket configured to be mounted on the wall; a mounting bracket that is mountable on a rear surface of the display module and including a mounting guide that extends to an upper side of the display module; and a guide member configured to couple to the wall bracket and, in a case where the display module is being mounted on the wall, guide the mounting guide on the upper side of the display module.

18 Claims, 20 Drawing Sheets

(56) References Cited

U.S. PATENT DOCUMENTS

| | | | |
|---|---|---|---|
| 11,395,548 B2 | 7/2022 | Yoon et al. | |
| 11,698,167 B2 | 7/2023 | Kim | |
| 2014/0166834 A1 | 6/2014 | Kuroyanagi et al. | |
| 2020/0132245 A1 | 4/2020 | Runger et al. | |
| 2022/0403975 A1* | 12/2022 | Bae | F16M 11/041 |

FOREIGN PATENT DOCUMENTS

| | | |
|---|---|---|
| JP | 4594553 B2 | 12/2010 |
| JP | 2013-62785 A | 4/2013 |
| JP | 5501866 B2 | 5/2014 |
| JP | 6494017 B2 | 4/2019 |
| JP | WO2020/101035 A1 | 5/2020 |
| KR | 10-0556244 B1 | 3/2006 |
| KR | 20-2010-003788 U | 4/2010 |
| KR | 10-1097356 B1 | 12/2011 |
| KR | 10-2013-0004706 A | 1/2013 |
| KR | 10-1247703 B1 | 3/2013 |
| KR | 10-2017-0051977 A | 5/2017 |
| KR | 10-1809065 B1 | 12/2017 |
| KR | 10-2018-0038182 A | 4/2018 |
| KR | 10-2019-0009235 A | 1/2019 |
| KR | 10-2019-0143603 A | 12/2019 |
| KR | 102158818 B1 * | 9/2020 .......... G06F 3/1446 |
| KR | 10-2021-0031286 A | 3/2021 |
| KR | 10-2021-0032086 A | 3/2021 |
| KR | 10-2021-0119095 A | 10/2021 |
| KR | 10-2023-0130452 A | 9/2023 |
| WO | 2021/194016 A1 | 9/2021 |

OTHER PUBLICATIONS

International Search Report (PCT/ISA/210) issued May 1, 2023 by the International Searching Authority in the International Patent Application No. PCT/KR2023/000216.

Written Opinion (PCT/ISA/237) issued May 1, 2023 by the International Searching Authority in the International Patent Application No. PCT/KR2023/000216.

* cited by examiner

WALL MOUNT DEVICE AND DISPLAY APPARATUS INCLUDING SAME

CROSS-REFERENCE TO RELATED APPLICATIONS

This application is a bypass continuation application of International Application No. PCT/KR2023/000216, filed on Jan. 5, 2023, which claims priority to Korean Application No. 10-2022-0027668, filed on Mar. 3, 2022, in the Korean Intellectual Property Office, the contents of which are incorporated herein by reference in their entireties.

BACKGROUND

1. Field

Embodiments of the present disclosure relate to a display apparatus and, more particularly, to a display apparatus configured to be mountable on a wall.

2. Brief Description of Background Art

A display apparatus is a kind of an output apparatus that visually displays obtained or stored image information to a user, and includes a motor and/or a television, and the display apparatus is used in various fields, such as a home or a workplace.

The display apparatus may include a display module provided to display a screen and a support device provided to support the display module. The display module may include a display panel and a display case provided to support the display panel.

The display module may include a self-luminous display panel such as an organic light-emitting diode (OLED) panel and a non-self luminous display panel such as a liquid crystal display (LCD).

The support device may be provided to support the display module to allow a front surface of the display panel, on which the screen is displayed, to face a viewer. Because the display module is roughly formed in the shape of a plate, a stand may be used as the support device when the display module is used by standing on the floor. Further, when the display module is used by hanging on a wall, a wall mount device fixed to the wall may be used as the support device.

In general, when the display module is mounted on the wall using the wall mount device, a gap between the display module and the wall may be narrow and an installer cannot visually check the gap. Accordingly, it may be difficult for the installer to mount the display module to the wall.

In addition, even after mounting the display module to the wall, it may be required to adjust a mounting position of the display module for reasons such as the display module being out of level. In the conventional case, it is required that the display module or the wall mount device be completely separated from the wall and then reinstalled, which causes the inconvenience.

SUMMARY

Embodiments of the present disclosure provide a wall mount device including an improved structure to allow a display module to be easily mounted on a wall, and a display apparatus including the same.

Embodiments of the present disclosure provide a wall mount device including an improved structure to guide a mounting position when mounting a display module on a wall, and a display apparatus including the same.

Embodiments of the present disclosure provide a wall mount device including an improved structure to allow a mounting position of a display module to be adjusted after mounting the display module on a wall, and a display apparatus including the same.

According to embodiments of the present disclosure, a wall mount device may be provided and configured to mount a display module, configured to display an image on a front surface of the display module, to a wall. The wall mount device may include: a wall bracket configured to be mounted on the wall; a mounting bracket that is mountable on a rear surface of the display module and including a mounting guide that extends to an upper side of the display module; and a guide member configured to couple to the wall bracket and, in a case where the display module is being mounted on the wall, guide the mounting guide on the upper side of the display module.

According to one or more embodiments of the present disclosure, the guide member may include a guide groove that is configured to receive and guide the mounting guide.

According to one or more embodiments of the present disclosure, at least a portion of the mounting guide may protrude to an upper side of the guide groove in a case where the mounting guide is inserted into the guide groove.

According to one or more embodiments of the present disclosure, the guide groove may include an inclined portion including a width that reduces in a direction in which the mounting guide is guided by the guide groove.

According to one or more embodiments of the present disclosure, the guide groove may further include an extension portion extending from one end of the inclined portion in the direction in which the mounting guide is guided along the guide groove, and the extension portion has a constant width.

According to one or more embodiments of the present disclosure, the inclined portion may extend from one end of the guide groove, the one end of the guide groove configured to receive the mounting guide into the guide groove.

According to one or more embodiments of the present disclosure, the guide groove may extend in a direction parallel to forward and backward directions of the display module.

According to one or more embodiments of the present disclosure, the guide groove may further include a block portion, wherein one end of the block portion, with respect to a direction in which the mounting guide is guided by the guide groove, is closed, and wherein the block portion is configured to, in a case where the mounting bracket is being mounted on the wall bracket, stop movement of the mounting guide in the direction in which the mounting guide is guided.

According to one or more embodiments of the present disclosure, the wall bracket may be configured to receive the mounting bracket therein such that the mounting bracket is mounted to the wall bracket.

According to one or more embodiments of the present disclosure, the mounting bracket may further include a penetrating portion through which the mounting guide is configured to penetrate.

According to one or more embodiments of the present disclosure, the penetrating portion may extend parallel to an extension direction of the mounting guide.

According to one or more embodiments of the present disclosure, the mounting guide may be movable within the penetrating portion.

According to one or more embodiments of the present disclosure, the guide member may include at least one insertion portion that is configured to be inserted into and coupled to the wall bracket.

According to one or more embodiments of the present disclosure, the at least one insertion portion may be a plurality of insertion portions, wherein the mounting bracket is configured to be mounted between the plurality of insertion portions.

According to one or more embodiments of the present disclosure, the wall bracket may further include a pressing member that is configured to reinforce a coupling force of the mounting bracket by pressing one surface of the mounting bracket mounted on the wall bracket.

According to embodiments of the present disclosure, a display apparatus may include a display module including a display panel configured to display an image on a front surface of the display panel and a case configured to support the display panel; and a wall mount device configured to mount the display module to a wall, the wall mount device including a wall bracket coupled to the wall; a mounting bracket configured to couple to a rear surface of the case and mountable to the wall bracket, the mounting bracket including a mounting guide extendable to an upper side of the case; and a guide member configured to couple to the wall bracket, and configured to guide at least a portion, which extends to the upper side of the case, of the mounting guide, at the upper side of the case, in a case where the display module is mounted on the wall.

According to one or more embodiments of the present disclosure, the guide member may include a guide groove provided on an upper portion of the guide member, the guide groove configured to receive and guide the mounting guide, and at least a portion of the mounting guide may protrude to an upper side of the guide groove in a case where the mounting guide is being guided by the guide groove.

According to one or more embodiments of the present disclosure, the guide member may include a guide body extending in a direction parallel to forward-backward direction of the display module, and the guide groove may be formed on the guide body.

According to one or more embodiments of the present disclosure, the mounting bracket may further include a bracket body configured to couple to the case, and the mounting guide may be movably supported by the bracket body, and the mounting guide may be configured to move the bracket body upward in a case where the mounting guide moves to a lower side of the display modules and presses the wall bracket.

According to embodiments of the present disclosure, a wall mount device, which is configured to mount a display module to a wall, may include: a wall bracket configured to couple to the wall; a mounting bracket configured to couple to the display module and mount to the wall bracket in a first direction, the mounting bracket comprising a mounting guide that is extendable in the first direction; and a guide member configured to couple to the wall bracket, the guide member configured to guide the mounting guide, which extends in the first direction, in a second direction different from the first direction, so as to allow the mounting bracket to be positioned in the first direction with respect to the wall bracket.

According to embodiments of the present disclosure, a wall mount device may include a mounting bracket and a wall bracket to allow a display module to be supported on a wall.

According to embodiments of the present disclosure, a wall mount device may include a mounting bracket including a mounting guide, and a guide member to guide a mounting position at which a display module is mounted on a wall.

According to embodiments of the present disclosure, a wall mount device may include a mounting guide provided to be movable so to allow a mounting position of a display module to be adjusted.

DETAILED DESCRIPTION

Figure 1:
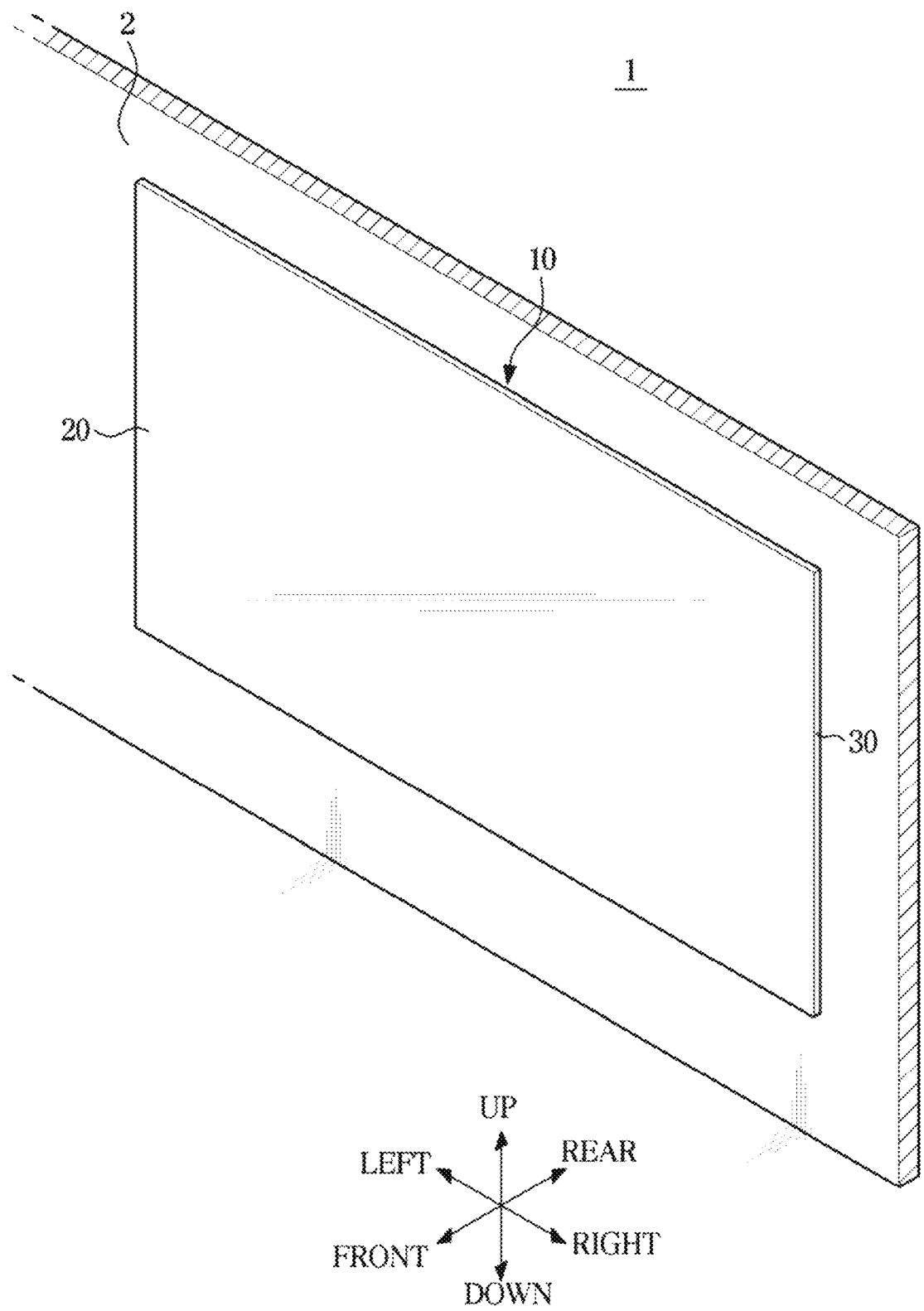
FIG. 1 is a perspective view illustrating a display apparatus mounted on a wall according to an embodiment of the present disclosure.

Embodiments described in the present disclosure and shown in the drawings are non-limiting example embodiments of the present disclosure, and may be modified in various different ways at the time of filing of the present application without departing from the spirit and scope of the present disclosure.

In addition, the same reference numerals or signs shown in the drawings of the present disclosure indicate elements or components performing substantially the same function. Shapes and sizes of elements in the drawings may be exaggerated for clear description.

Also, the terms used herein are used to describe example embodiments and are not intended to limit and/or restrict the present disclosure. The singular forms "a," "an," and "the" are intended to include the plural forms as well, unless the context clearly indicates otherwise. In this disclosure, the terms "including," "having," and the like are used to specify features, numbers, steps, operations, elements, components, or combinations thereof, but do not preclude the presence or addition of one or more of the features, elements, steps, operations, elements, components, or combinations thereof.

It will be understood that, although the terms "first," "second," "third," etc., may be used herein to describe various elements, but elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

In the following detailed description, the terms "vertical direction," "lower side," "forward and backward directions" and the like may be defined by the drawings, but the shape and the location of components are not limited by the terms.

Hereinafter for convenience of description, a display module included in a display apparatus will be described as an example of a television (TV), which is a type of display module. However, the display module to which a configuration of embodiments of the present disclosure is applied is not limited to the TV. For example, the configuration of embodiments of the present disclosure may be applied to a monitor, which is a type of display module and is an output device of a computer.

Further, a display apparatus including a flat display module is described as an example embodiment of the present disclosure, but the configuration of embodiments of the present disclosure may be applied to a curved display module or a bendable or flexible display module in which a flat state and a curved state are variable. Further, the configuration of embodiments of the present disclosure may be applied to display apparatus of various shapes regardless of a screen size of the display module.

Hereinafter non-limiting example embodiments of the present disclosure will be described in detail with reference to the accompanying drawings.

Figure 2:
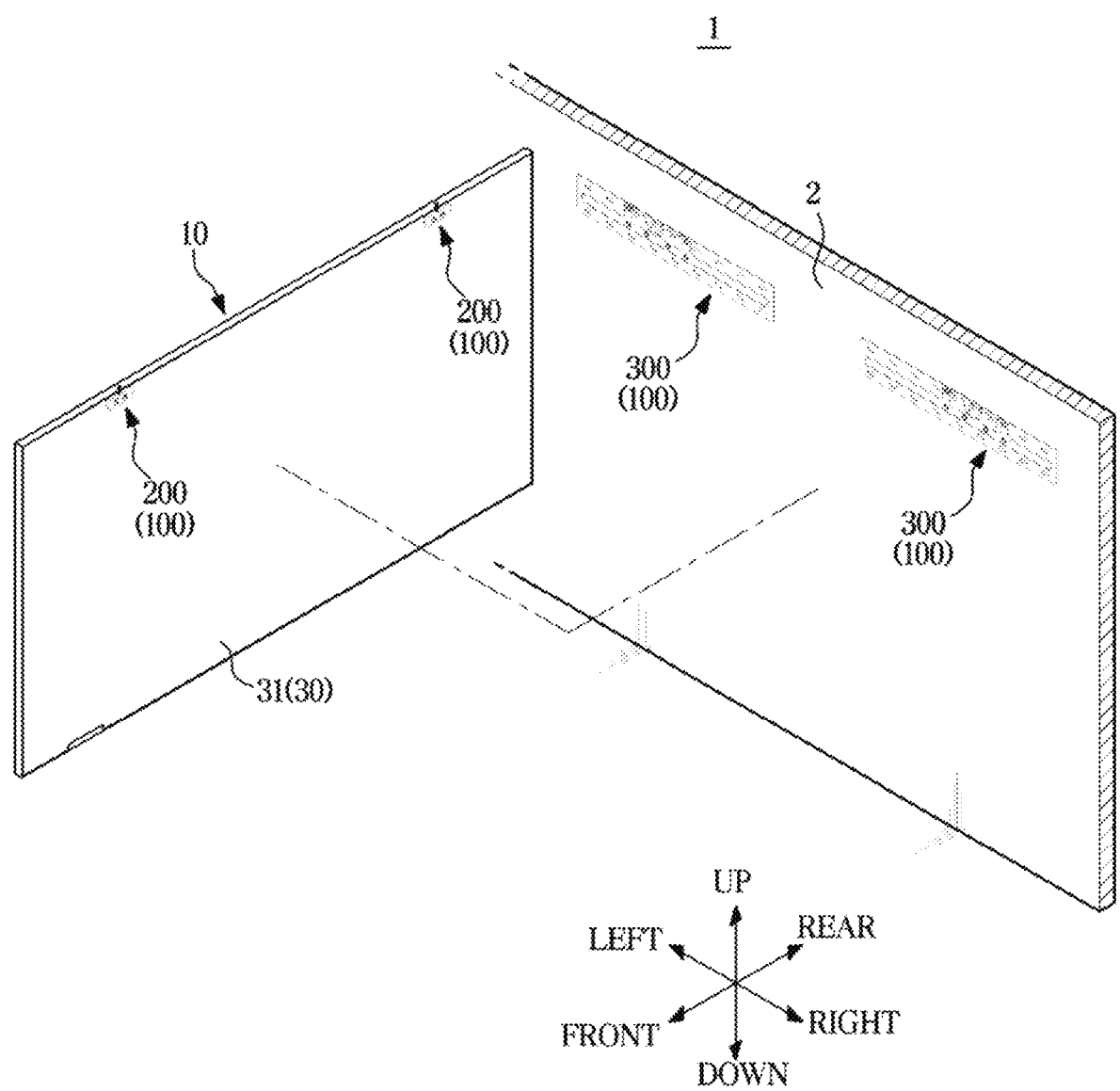
FIG. 2 is a view illustrating a mounting relationship between the display apparatus of FIG. 1 and the wall.

FIG. 1 is a perspective view illustrating a display apparatus mounted on a wall according to an embodiment of the present disclosure. FIG. 2 is a view illustrating a mounting relationship between the display apparatus of FIG. 1 and the wall.

Referring to FIGS. 1 and 2, a display apparatus 1 according to an embodiment of the present disclosure may include a display module 10 and a wall mount device 100. The display module 10 may be mounted on a wall 2 by the wall mount device 100.

The display module 10 may receive content data including video signals and audio signals from various content sources, and output video and audio corresponding to the video signals and the audio signals. For example, the display module 10 may receive content data through a broadcast reception antenna or cable, receive content data from a content playback device, and/or receive content data from a content providing server of a content provider.

The display module 10 may be configured to display a screen. Particularly, the display module 10 may include a display panel 20 provided to display an image, and thus a front surface of the display module 10 may display an image.

A plurality of pixels may be formed on the display panel 20. A screen displayed on a screen display area may be formed by combining light emitted from the plurality of pixels. For example, a single screen may be formed by combining light emitted from the plurality of pixels like a mosaic.

Each of the plurality of pixels may emit different brightness and different color of light. Particularly, the plurality of pixels may include sub-pixels, respectively, and the sub-pixels may include a red sub pixel emitting red light, a green sub pixel emitting green light, and a blue sub pixel emitting blue light. By combining the red light of the red sub pixel, the green light of the green sub pixel and the blue light of the blue sub pixel, each of the plurality of pixels may emit different brightness and different color of light.

The display module 10 may include a self-luminous display panel such as organic light-emitting diode (OLED) panel and a non-self luminous display panel such as a liquid crystal display (LCD) panel. There is no particular limitation on the type of display panel 20, and the display module 10 may include various types of display panels 20. For example, the display module 10 may be a micro-LED type display panel 20

When the display panel 20 is an LCD panel, the display panel 20 may include a thin film transistor (TFT) substrate, in which thin film transistors (TFTs) are formed in a matrix form, a color filter substrate coupled in parallel with the TFT substrate, and a liquid crystal that is injected between the TFT substrate and the color filter substrate and has optical properties that vary depending on changes in voltage or temperature. Additionally, a backlight unit (BLU) may be disposed inside a case 30.

The backlight unit may be arranged at the rear of the display panel 20 to emit light toward the display panel 20. In this case, the display panel 20 may block or pass light emitted from the backlight unit.

However, embodiments of the present disclosure are not limited thereto, and as described above, the display panel 20 may be a self-luminous display panel such as an OLED panel or a micro-LED panel.

A cable configured to transmit image data to the display panel 20, and a display driver integrated circuit (DDI) configured to process digital image data and output an analog image signal may be provided at one side of the display panel 20.

The display module 10 may include the case 30 provided to accommodate the display panel 20. The case 30 may form the exterior of the display module 10, and components for the display module 10 to display images or perform various functions, such as the display panel 20, may be accommodated inside the case 30.

The case 30 may include a top chassis provided to support a front surface or a side surface of the display panel 20, a bottom chassis disposed at the rear of the display panel 20, and a rear cover 31 provided to form a rear surface of the display module 10 by being coupled to a rear portion of the bottom chassis.

When the backlight unit is disposed in the display module 10, the bottom chassis may be disposed behind the backlight unit. The case 30 may include a middle mold disposed between the top chassis and the bottom chassis, and the middle mold may be provided to support the backlight unit.

According to an embodiment, the top chassis may include a bezel portion provided to cover the front surface of the display panel so as to support the front surface of the display panel.

Recently, in order to improve the aesthetics of the display module, display modules that minimize a width of a bezel have been developed. Particularly, bezel-less display modules, in which a configuration formed on the outside of the display panel is minimized when a user looks from the front of the display module, have been developed. Accordingly, the top chassis may be configured to support only the side surface of the display module without supporting the front surface, and further, the display module may not include the top chassis, but the side surface of the display module may be supported by the bottom chassis or the rear cover.

The display module 10 illustrated in FIG. 1 may be the bezel-less type display module described above. That is, the case 30 of the display module 10 may include a relatively narrow bezel or no bezel portion, and most of the front surface of the display module 10 may be composed of the display panel 20.

As described above, the display panel 20 may be an LCD panel, but may also be a self-luminous display panel such as an OLED panel, in which the display module 10 is not provided with the backlight unit. Alternatively, the case 30 may not include the middle mold. Further, the case 30 may include a top chassis including a bezel portion that covers at least a portion of the front surface of the display panel 20, unlike FIG. 1.

The display module 10 may have a shape in which a length of the horizontal side and a length of the vertical side are different from each other. That is, the display module 10 may be provided to have a long side and a short side. The display module 10 may be provided in a rectangular plate shape. However, embodiments of the present disclosure are not limited thereto, and the display module 10 may be provided in the shape of a square plate in which the lengths of the long and short sides are approximately equal.

The display module 10 may be provided in various sizes. The ratio between the long side and the short side of the display module 10 is not limited to general cases such as 16:9 and 4:3, and may be provided at any ratio.

The display module 10 according to embodiments of the present disclosure are not limited thereto and may be provided to include various configurations.

The display module 10 may be supported by the wall 2. The display module 10 may be mounted and supported on the wall 2 by the wall mount device 100, and the wall mount device 100 may function as a support device for supporting the display module 10.

When the display module 10 is mounted on the wall 2, the front surface of the display module 10, on which the display panel 20 displays an image, may face a viewer, and the rear surface of the display module 10, which is opposite to the front surface, may face the wall 2. That is, the rear cover 31, which is the rear surface of the case 30 of the display module 10, may be arranged to face the wall 2.

As illustrated in FIGS. 1 and 2, the wall 2, on which the display module 10 is mountable, may be generally provided to stand perpendicular to the floor and include a structure including a flat surface on which the display module 10 is mounted. In this case, the display module 10 may be arranged to stand perpendicular to the floor as being mounted on the wall 2.

Further, the display module 10 may generally be mounted on the wall 2 to be spaced apart from the floor by a predetermined height. However, embodiments of the present disclosure are not limited thereto, and the method or configuration in which the display module 10 is mounted on the wall 2 may vary.

According to embodiments, the wall 2 on which the display module 10 is mountable may be an inner wall located inside a building. Alternatively, the wall 2 may be an outer wall located outside the building, and in this case, the display module 10 may be placed outside the building. As a part of the building, the wall 2 may be a structure that forms the building. However, the wall is not limited thereto, and the wall 2 may be a separate structure that is separated from the building, and may be various configurations on which the display module 10 is mountable and supportable.

The wall mount device 100 that is configured to mount the display module 10 to the wall 2 may include a mounting bracket 200 configured to be coupled to the display module 10, and a wall bracket 300 configured to be coupled to the wall 2. The mounting bracket 200 may be provided to be mountable on the wall bracket 300, and the display module 10 may be mounted on the wall 2 as the mounting bracket 200 is mounted on the wall bracket 300.

The mounting bracket 200 may be provided on the rear surface of the display module 10. That is, the mounting bracket 200 may be provided to be mountable on the rear surface of the display module 10. In other words, the mounting bracket 200 may be configured to be coupled to the rear surface of the display module 10. In other words, the mounting bracket 200 may be coupled to the rear surface of the case 30 of the display module 10, that is, the rear cover 31.

The wall bracket 300 may be provided on the wall 2 and may be provided at a position corresponding to the position of the mounting bracket 200 to allow the mounting bracket 200 to be mounted thereon. In other words, the wall bracket 300 may be fastened to a specific position on one surface of the wall 2, on which the display module 10 is mounted, so as to correspond to the position of the mounting bracket 200.

The mounting bracket 200 may be provided in an upper portion of the display module 10. In other words, the mounting bracket 200 may be provided in an upper portion of the rear surface of the case 30, that is, the rear cover 31. Correspondingly, the wall bracket 300 may also be provided on the wall 2 to be adjacent to the upper portion of the display module 10 when the display module 10 is mounted on the wall 2. However, embodiments of the present disclosure are not limited thereto, and the positions of the mounting bracket 200 and the wall bracket 300 may be located in various positions on the rear surface of the display module 10 or one surface of the wall 2, so as to allow the display module 10 to be mounted on the wall 2.

The mounting bracket 200 and the wall bracket 300 may be provided in corresponding numbers. That is, as illustrated in FIG. 2, when a plurality of mounting brackets 200 is provided, a plurality of wall brackets 300 may also be provided to have a corresponding number.

However, embodiments of the present disclosure are not limited thereto, and the number of mounting brackets 200 and wall brackets 300 may vary as long as the display module 10 is provided to be stably supported on the wall 2. For example, a single mounting bracket 200 and a single wall bracket 300 may be provided, or it is possible to provide more than two mounting brackets 200 and wall brackets 300, which is the number of mounting brackets 200 or wall brackets 300 shown in FIG. 2.

In addition, the numbers of mounting brackets 200 and wall brackets 300 do not necessarily have to correspond to each other. For example, even when a plurality of mounting brackets 200 is provided, a single wall bracket 300 may be provided. Even in this case, the plurality of mounting brackets 200 may be all mounted to the single wall bracket 300. Conversely, even when a single mounting bracket 200 is provided, a plurality of wall brackets 300 may be provided.

When a plurality of mounting brackets 200 is provided, the plurality of mounting brackets 200 may be provided at positions, which are symmetrical to each other with respect to the center of the display module 10, on the rear surface of the display module 10, that is, the rear cover 31. However, embodiments of the present disclosure are not limited thereto, and the plurality of mounting brackets 200 may be arranged in various ways to allow the display module 10 to be stably disposed on the wall 2.

In the same manner as the mounting bracket, when a plurality of wall brackets 300 is provided, the plurality of wall brackets 300 may be provided at positions, which are symmetrical to each other with respect to the center of the display module 10 mounted on the wall 2, on one surface of the wall 2. However, embodiments of the present disclosure are not limited thereto, and the plurality of wall brackets 300 may be arranged in various ways to allow the display module 10 to be stably disposed on the wall 2.

A specific configuration and function of the wall mount device 100 including the mounting bracket 200 and the wall bracket 300 will be described later.

Figure 3:
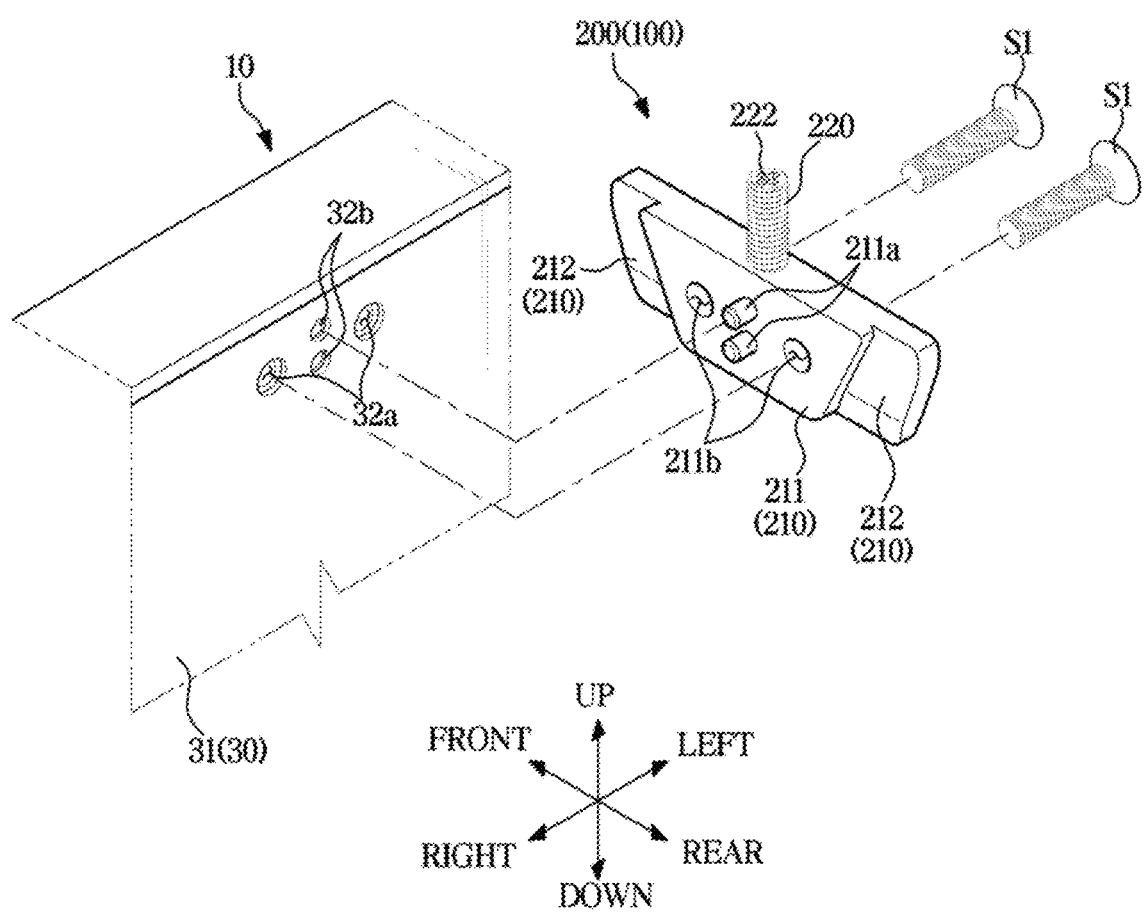
FIG. 3 is a view illustrating a coupling relationship between a display module and a mounting bracket of a wall mount device according to an embodiment of the present disclosure.
Figure 4:
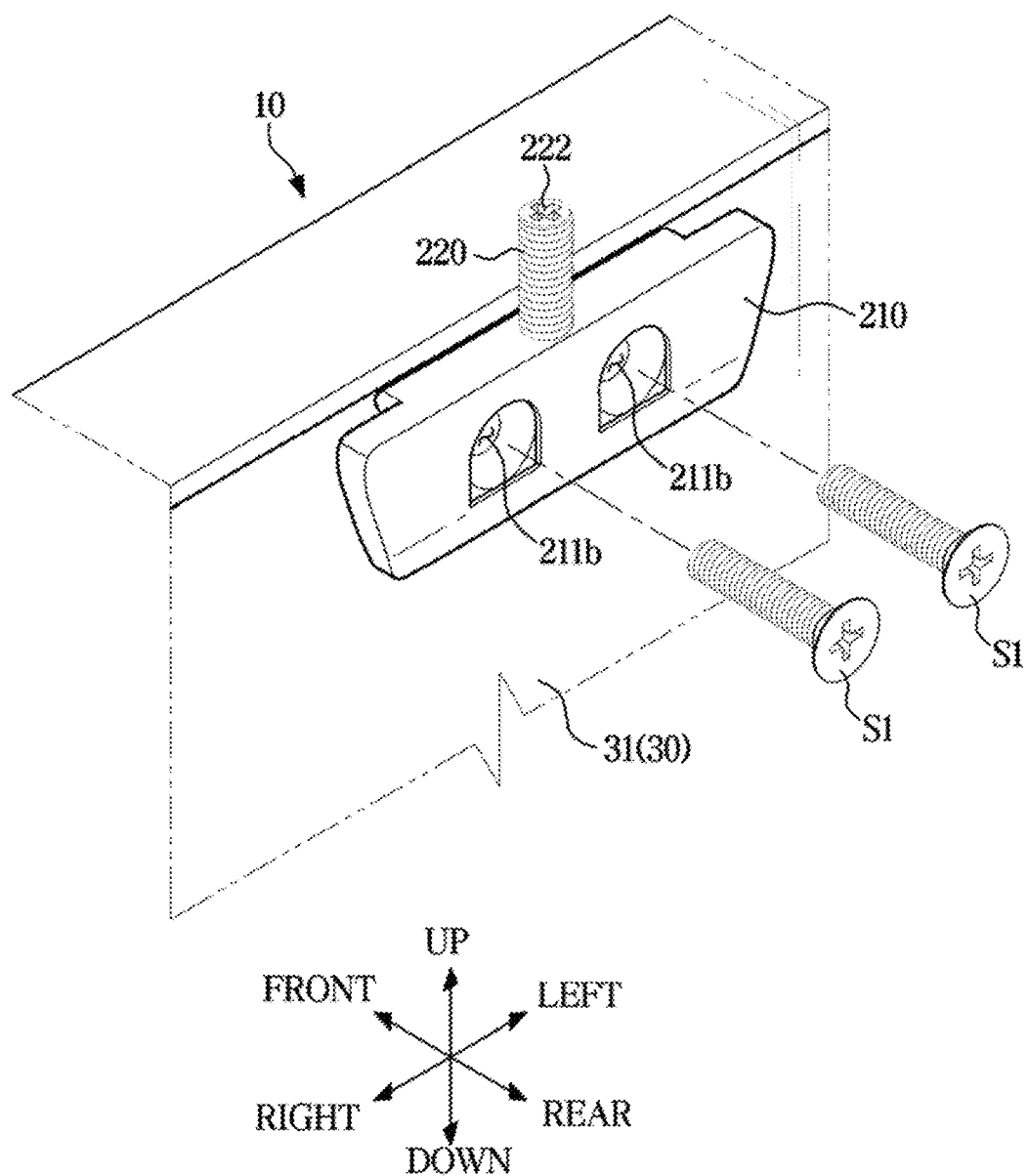
FIG. 4 is a view illustrating the mounting bracket coupled to the display module of FIG. 3.

FIG. 3 is a view illustrating a coupling relationship between a display module and a mounting bracket of a wall mount device according to an embodiment of the present disclosure. FIG. 4 is a view illustrating the mounting bracket coupled to the display module of FIG. 3.

Referring to FIGS. 3 and 4, the mounting bracket 200 of the wall mount device 100 may be configured to be mountable on the rear surface of the display module 10 to allow the display module 10 to be mountable on the wall bracket 300 provided on the wall 2. In other words, the mounting bracket 200 may be configured to be coupled to the rear surface of the case 30, that is, the rear cover 31.

The mounting bracket 200 may include a bracket body 210 provided to be mountable on a mounting portion 340 (refer to FIG. 5) of the wall bracket 300, which will be described later. The bracket body 210 may be inserted into the mounting portion 340 of the wall bracket 300, which will be described later, so as to be mounted on the wall bracket 300.

The bracket body 210 may include a display coupling portion 211 to be coupled to the display module 10. The case 30 of the display module 10 may be provided with mounting bracket coupling portions (e.g., an insertion groove 32*a* and a fastening hole 32*b*) so as to be coupled to the display coupling portion 211 of the bracket body 210.

The display coupling portion 211 may be provided to face the rear surface of the display module 10 to allow the mounting bracket 200 to be coupled to the display module 10.

The display coupling portion 211 of the mounting bracket 200 may include an insertion protrusion 211*a* formed to protrude forward, and the mounting bracket coupling portions of the display module 10 may include an insertion groove 32*a* formed to be recessed on the case 30 to correspond to the insertion protrusion 211*a*. The insertion protrusion 211*a* and the insertion groove 32*a* may be provided at positions corresponding to each other and may be formed to have shapes corresponding to each other. As the insertion protrusion 211*a* is inserted into the insertion groove 32*a*, the mounting bracket 200 may be coupled to the display module 10.

The display coupling portion 211 of the mounting bracket 200 may include a fastening hole 211*b* penetrating the display coupling portion 211, and the mounting bracket coupling portions of the display module 10 may include a fastening hole 32*b* penetrating the rear surface of the case 30 to correspond to the fastening hole 211*b*. The fastening hole 211*b* of the display coupling portion 211 and the fastening hole 32*b* of the case 30 may be provided at positions corresponding to each other, and the mounting bracket 200 may be fastened to the display module 10 by screws S1 sequentially passing through the fastening hole 211*b* of the display coupling portion 211 and the fastening hole 32*b* of the case 30. In other words, the mounting bracket 200 may be coupled to the rear surface of the display module 10 by the screw S1 fastened in a direction from the rear side to the front side of the display module 10.

However, embodiments of the present disclosure are not limited thereto, and the method of coupling the mounting bracket 200 and the display module 10 shown in FIGS. 3 and 4 is merely one example of various methods in which the mounting bracket 200 is coupled to the display module 10 according to embodiments of the present disclosure.

Alternatively, unlike FIGS. 3 and 4, the display module 10 may include an insertion protrusion provided to protrude from the case 30, and the mounting bracket 200 may be coupled to the display module 10 in a method in which the insertion protrusion of the display module 10 is inserted into an insertion groove formed in the display coupling portion 211 of the mounting bracket 200.

Alternatively, unlike FIGS. 3 and 4, the mounting bracket 200 and the display module 10 may be coupled to each other without a structure in which the insertion protrusion 211*a* is inserted into the insertion groove 32*b*, or a structure in which the mounting bracket 200 is fastened to the display module 10 through the screw S1.

In addition, the number of insertion protrusions 211*a* and insertion grooves 32*b* or the number of screws S1, fastening holes 32*b*, and fastening holes 211*b* is not limited to the number shown in FIGS. 3 and 4, and may be provided in various numbers such as one or three or more.

Further, the mounting bracket 200 and the display module 10 do not necessarily have to be coupled in the forward and backward directions. For example, the mounting bracket 200 may include a configuration provided to be in contact with a side surface (including the upper surface, lower surface, and left and right surfaces) of the display module 10 and thus the mounting bracket 200 may be laterally (including the vertical direction and the horizontal directions) coupled to the display module 10.

In this case, the mounting bracket 200 may be provided at the rear surface of the display module 10 as at least a portion of the bracket body 210 is disposed at the rear side of the display module 10. However, when considering that a user views the display apparatus 1 from the front, the appearance quality of the display apparatus 1 may be improved as the mounting bracket 200 is coupled to the rear surface of the display module 10.

As described above, the mounting bracket 200 and the display module 10 may be configured in various ways to be coupled to each other by including the embodiments described with reference to FIGS. 3 and 4.

The bracket body 210 may include a front support portion 212 formed to allow a front portion thereof to be supported by the wall bracket 300 when the mounting bracket 200 is mounted on the wall bracket 300. As the bracket body 210 is coupled to the display module 10 by the display coupling portion 211, a front side of a portion of the bracket body 210, such as the display coupling portion 211, may not be supported by the wall bracket 300 (refer to FIG. 6), and in this case, the front support portion 212 may be provided to allow a front portion of the bracket body 210 to be supported by the wall bracket 300. Particularly, the front support portion 212 may be supported by a mounting portion forming portion 312 (refer to FIG. 5) of the wall bracket 300, which will be described later.

As illustrated in FIGS. 3 and 4, the display coupling portion 211 and the front support portion 212 may be formed to have a stepped shape. Particularly, when the mounting bracket 200 is mounted on the wall bracket 300, the display coupling portion 211 may be formed to protrude more forward than the front support portion 212 that is supported and in contact with the wall bracket 300. As the display coupling portion 211 comes into closer contact with the rear surface of the display module 10, the mounting bracket 200 may be more stably coupled to the display module 10.

A side surface of the display coupling portion 211, in which a stepped portion is formed with the front support portion 212, may be inclined. Particularly, the side surface of the display coupling portion 211 may have a shape that is closer to a center line of the mounting bracket 200 from an upper portion to a lower portion of the mounting bracket 200. Accordingly, when the mounting bracket 200 is mounted on the mounting portion 340 (refer to FIG. 5) of the wall bracket 300, which will be described later, a mounting position of the mounting bracket 200 may be guided by a mounting opening 341 (refer to FIG. 5) of the wall bracket 300 that is inclined to correspond thereto, and the mounting bracket 200 may be inserted into the mounting portion 340.

However, embodiments of the present disclosure are not limited thereto, and the bracket body 210 may be formed to have various shapes. For example, the display coupling portion 211 and the front support portion 212 may be formed to be arranged side by side on the same plane.

The mounting bracket 200 may include a mounting guide 220 provided to be extendable to an upper side of the display module 10. The mounting guide 220 may be provided to extend upward from the bracket body 210 and particularly, the mounting guide 220 may be provided to extend to allow at least a portion of the mounting guide 220 to be located above an upper end of the display module 10.

The mounting guide 220 may be provided to protrude from the bracket body 210 in at least one direction, and the mounting guide 220 may be formed to have a bar shape. However, embodiments of the present disclosure are not limited thereto, and the mounting guide 220 may have various shapes.

As the mounting guide 220 is provided to be extend to the upper side of the display module 10, a user can see the mounting guide 220 when the user looks from the front of the display module 10. Accordingly, the user can easily recognize a position of the mounting bracket 200 including the bracket body 210 disposed at the rear side of the display module 10.

A specific configuration and operation of the mounting guide 220 will be described later.

The display module 10 and the mounting bracket 200 do not necessarily have to be provided as separate components as described above. Even when the mounting bracket 200 is provided integrally with the case 30 of the display module 10, the mounting bracket 200 may perform the function of the above-mentioned mounting bracket 200 as long as the mounting bracket 200 is configured to be mountable to the wall bracket 300. For example, a mounting bracket integrally formed with the case 30 and provided to protrude toward the rear side of the display module 10 may be provided on the rear surface of the display module 10. When the mounting bracket is mountable on the wall bracket 300, the display module 10 may ultimately be mounted on the wall 2. Even in this case, the mounting guide 220 may be provided to extend to the upper side of the display module 10 with respect to the mounting bracket formed integrally with the case 30.

Figure 5:
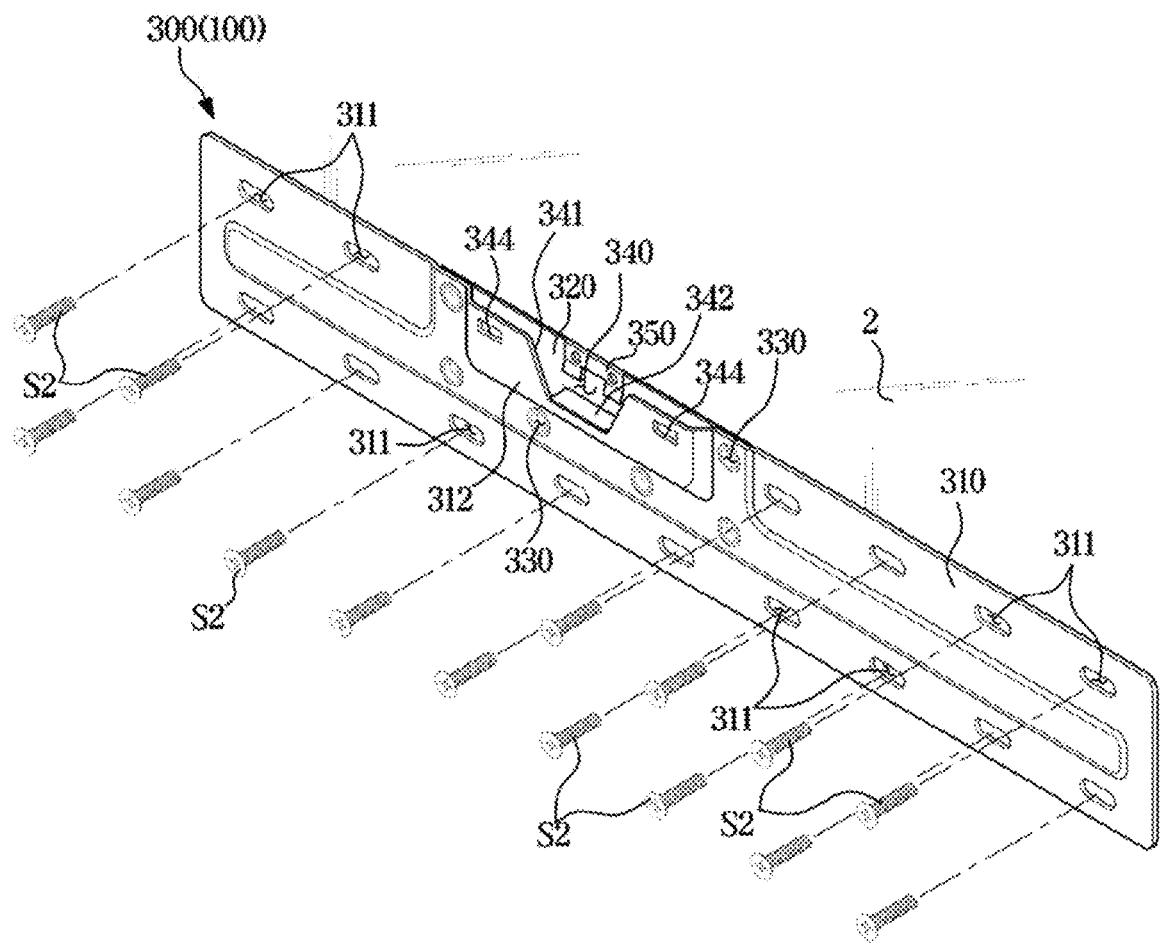
FIG. 5 is a perspective view illustrating a wall bracket of the wall mount device according to an embodiment of the present disclosure.
Figure 5:
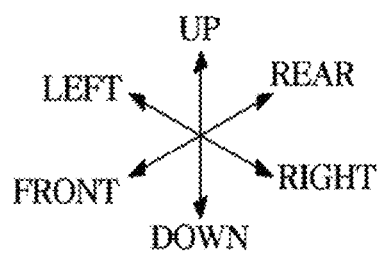
Figure 6:
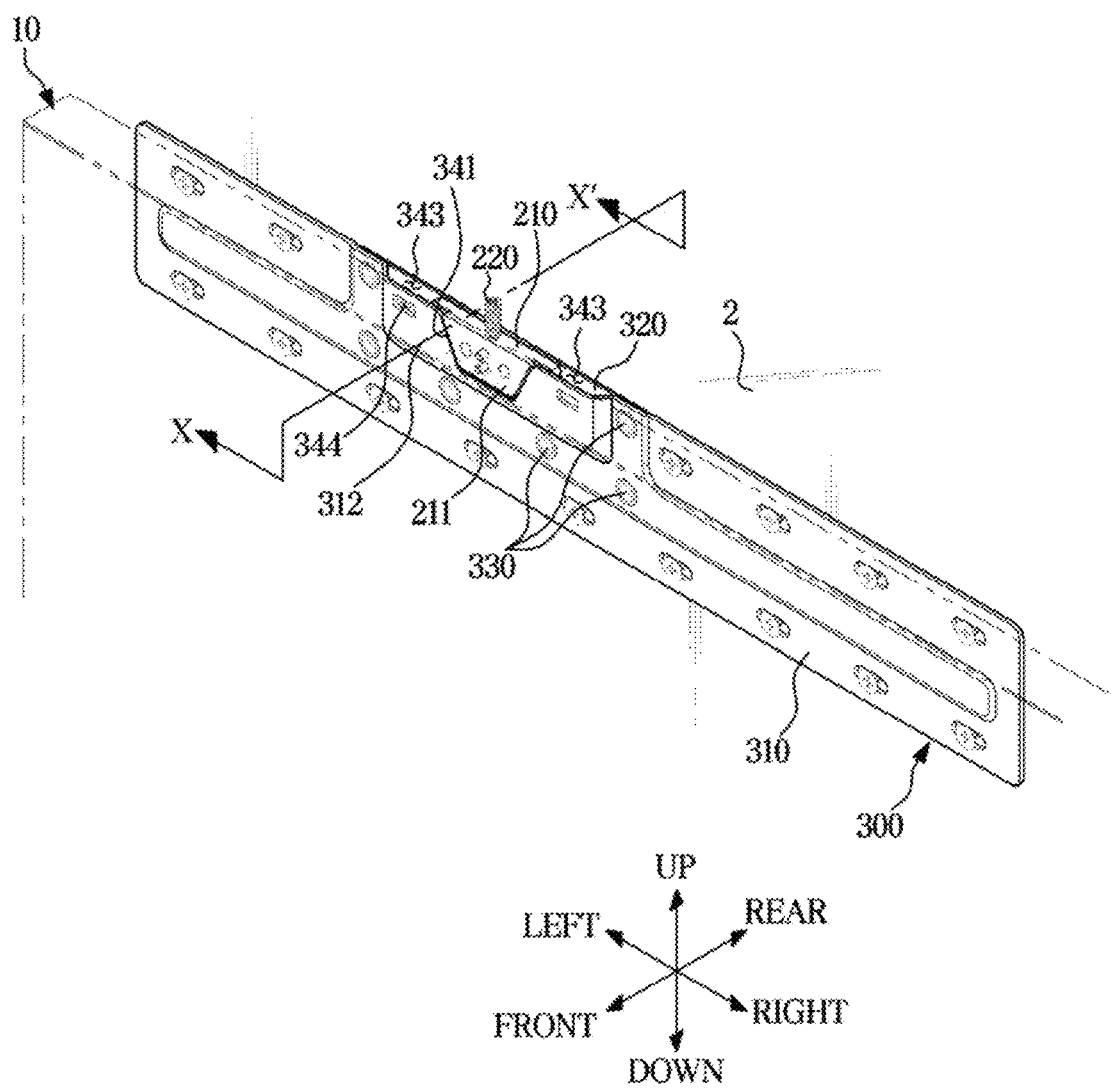
FIG. 6 is a view illustrating a state in which the display module according to an embodiment of the present disclosure is mounted on the wall bracket using the mounting bracket.
Figure 7:
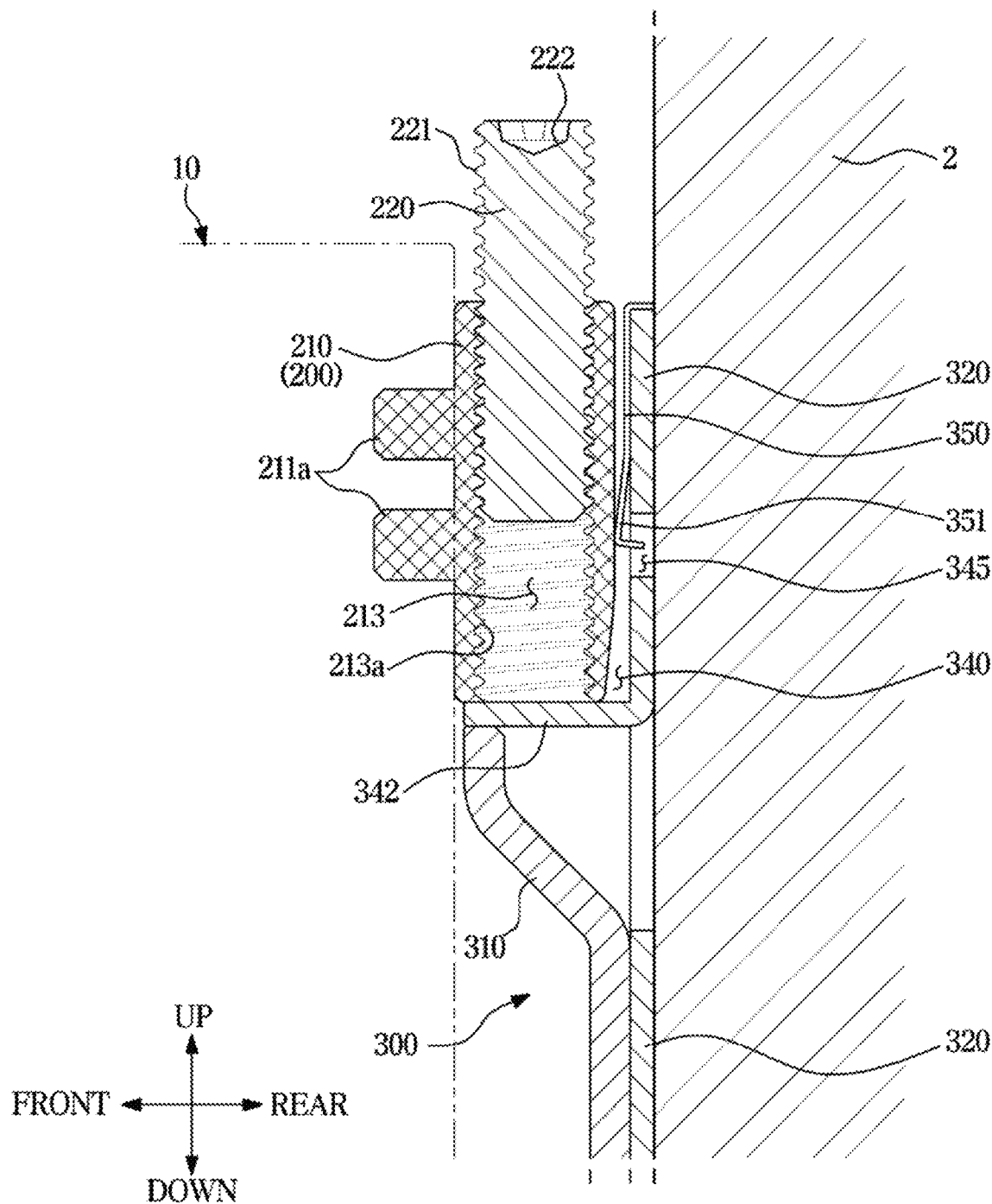
FIG. 7 is a cross-sectional view taken along line X-X' in FIG. 6.
Figure 8:
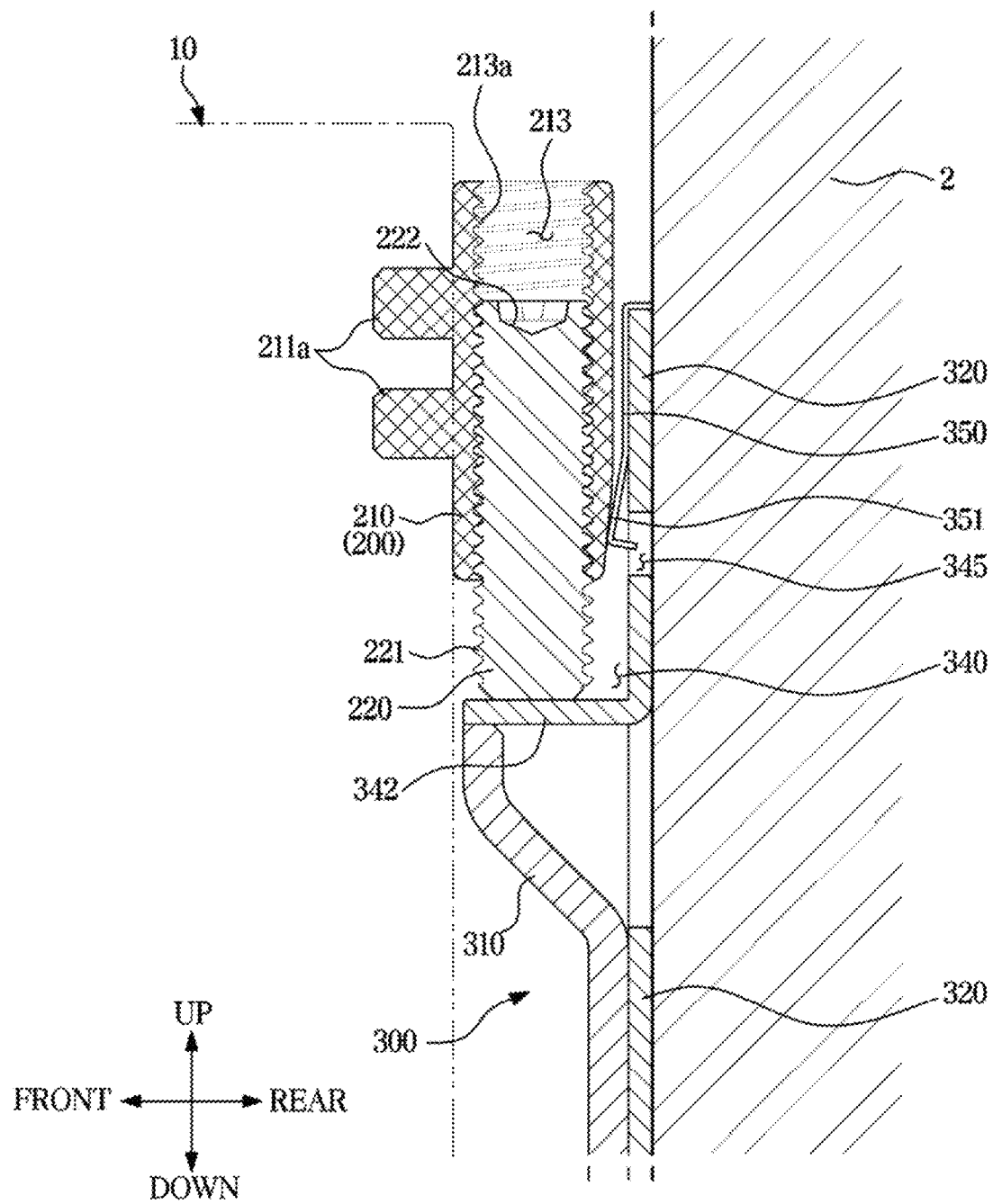
FIG. 8 is a view illustrating a state in which a mounting position of the display module is adjusted by using a mounting guide according to an embodiment of the present disclosure.

FIG. 5 is a perspective view illustrating a wall bracket of the wall mount device according to an embodiment of the present disclosure. FIG. 6 is a view illustrating a state in which the display module according to an embodiment of the present disclosure is mounted on the wall bracket using the mounting bracket. FIG. 7 is a cross-sectional view taken along line X-X' in FIG. 6. FIG. 8 is a view illustrating a state in which a mounting position of the display module is adjusted by using a mounting guide according to an embodiment of the present disclosure.

Referring to FIGS. 5 to 8, the wall mount device 100 may include the wall bracket 300 provided on the wall 2 and provided to allow the mounting bracket 200 to be mounted thereto. As the mounting bracket 200 coupled to the display module 10 is mounted on the wall bracket 300 provided on the wall 2, the display module 10 may be mounted and supported on the wall 2.

The wall bracket 300 may be formed to have an overall flat plate shape. Accordingly, when the display module 10 is mounted on the wall 2, a distance between the display module 10 and the wall 2 may be reduced, and the display module 10 may be more stably mounted on the wall 2. At the same time, space utilization efficiency may be improved.

The wall bracket 300 may be coupled to the wall 2 by a screw S2 penetrating the wall bracket 300. Particularly, the wall bracket 300 may be fastened to the wall 2 by including a wall fastening hole 311 formed to be penetrated by the screw S2. The screw S2 may fasten the wall bracket 300 to the wall 2 by penetrating the wall fastening hole 311 in a direction from the front to the rear of the wall 2.

As illustrated in FIGS. 5 to 8, the wall bracket 300 may be fastened to the wall 2 by a plurality of wall fastening holes 311 and a plurality of screws S2 penetrating the plurality of wall fastening holes 311, but is not limited thereto. The wall fastening holes 311 and screws S2 may be provided in various numbers.

The wall fastening hole 311 may be provided in the form of a long hole that is longer, in at least one direction, than a diameter of a body of the screw S2.

In a comparative embodiment, when a position of the wall bracket 300 is out of position during the process of coupling the wall bracket 300 to the wall 2, the display module 10 mounted on the wall bracket 300 may be out of level and thus the appearance quality of the display module 10 may be deteriorated. Accordingly, the wall fastening hole 311 may be formed in the form of a long hole, thereby compensating for errors that may occur in the process of coupling the wall bracket 300 to the wall 2.

Even when the wall fastening hole 311 is provided to have the shape of a long hole, a width, which is in at least one direction, of the wall fastening hole 311 may be less than a diameter of a head of the screw S2 and thus the wall bracket 300 may be restrained by the head of the screw S2. However, embodiments of the present disclosure are not limited thereto, and the wall fastening hole 311 may be formed in various shapes, such as a circle with a constant radius.

Meanwhile, in FIGS. 5 to 8, the case in which the wall bracket 300 is fastened to the wall 2 by a screw fastening method is described as an example, but this is a non-limiting example of a method of coupling the wall bracket 300 to the wall 2. The method in which the wall bracket 300 is provided on the wall 2 is not limited thereto, and the wall bracket 300 may be coupled to the wall 2 in various ways.

For example, the wall bracket 300 may be coupled to the wall 2 in various ways, such as being hooked by a separate structure provided on the wall 2, or being bonded to the wall 2 with an adhesive. Further, according to the type of the wall 2, the wall bracket 300 may be provided integrally with the wall 2.

However, for convenience of description, the description will be made on the assumption that the wall bracket 300 is coupled to the wall 2 by the screw S2.

The wall bracket 300 may include the mounting portion 340 on which the mounting bracket 200 is mountable. Particularly, the mounting portion 340 may be provided to include a space into which the mounting bracket 200 is inserted and at least a portion of the mounting bracket 200 is accommodated. In other words, the mounting bracket 200 may be provided to be inserted into the mounting portion 340 and may be provided to be mounted on the wall bracket 300. However, embodiments of the present disclosure are not limited thereto, and the mounting bracket 200 may be mounted using a method other than being inserted into the wall bracket 300.

The wall bracket 300 may be formed to have an overall flat plate shape, as described above, but the wall bracket 300 may include the mounting portion forming portion 312 having a protruding shape to form the mounting portion 340 as illustrated in FIGS. 5 to 8.

Particularly, the mounting portion forming portion 312 may protrude toward the front side of the wall 2 and thus the mounting portion 340 may be formed on an inner side of the mounting portion forming portion 312. In other words, the mounting portion forming portion 312 may protrude toward the display module 10, and the mounting portion 340 may be formed at the rear of the mounting portion forming portion 312. Accordingly, the mounting bracket 200 may be inserted into the mounting portion 340.

The mounting portion forming portion 312 may be provided to support the front support portion 212 of the bracket body 210 when the mounting bracket 200 is mounted on the wall bracket 300 as illustrated in FIG. 6. Accordingly, the bracket body 210 of the mounting bracket 200 may be coupled to the display module 10 and stably mounted on the wall bracket 300 at the same time.

The mounting bracket 200 may be mounted on the wall bracket 300 with respect to the vertical direction. Particularly, while the mounting bracket 200 moves from the top to the bottom with respect to the wall bracket 300, the mounting bracket 200 may be inserted and mounted to the mounting portion 340. In other words, while the display module 10 moves downward by the mounting bracket 200, the display module 10 may be mounted on the wall bracket 300. Finally, while the display module 10 moves downward, the display module 10 may be mounted on the wall 2.

The mounting portion 340 may be formed to have a groove shape, in which an upper side is open, to allow the mounting bracket 200 to be vertically mounted thereon.

As the mounting bracket 200 is vertically mounted on the wall bracket 300, a user can stably mount the display module 10 to the wall 2 by inserting the mounting bracket 200 into the wall bracket 300.

In other words, because a direction in which the mounting bracket 200 is mounted on the wall bracket 300 is parallel with the direction of gravity applied to the display module 10 and the mounting bracket 200, the display module 10 may be stably supported on the wall 2 without an additional fixing device. Even in this case, the wall mount device 100 may further include a separate configuration (e.g., sub-wall bracket 400 of FIGS. 9 to 11, etc.) to more stably mount the display module 10 to the wall 2, thereby further increasing the stability.

The wall bracket 300 may include a bottom support portion 342 provided inside the mounting portion 340 to support the lower portion of the mounting bracket 200. The bottom support portion 342 may be provided in a lower portion of the mounting portion 340 and guide a lower end of the mounting bracket 200 at a mounting position when the mounting bracket 200 is vertically inserted into the mounting portion 340.

The mounting portion 340 may be provided to allow the mounting bracket 200 to be accommodated therein and mounted thereon. Further, the mounting bracket 200 may be coupled to the rear surface of the display module 10 as described above, and thus the mounting portion 340 may include the mounting opening 341 provided to allow a portion, in which the mounting bracket 200 is coupled to the display module 10, to be open.

The mounting opening 341 may be formed on the front surface of the wall bracket 300. Particularly, the mounting opening 341 may be provided in front of the mounting portion 340, and provided to allow the display coupling portion 211 of the mounting bracket 200 to be exposed to the front side. The mounting opening 341 may be formed on the mounting portion forming portion 312.

Accordingly, when the mounting bracket 200 coupled to the display module 10 is mounted on the wall bracket 300, the display coupling portion 211 may not interfere with the wall bracket 300, particularly, the mounting portion forming portion 312. In other words, the mounting bracket 200 may be inserted into the mounting portion 340 and mounted on the wall bracket 300 while the mounting bracket 200 is coupled to the rear surface of the display module 10.

As described above, the side surface of the display coupling portion 211, in which a stepped portion is formed with the front support portion 212, may be inclined. Particularly, the side surface of the display coupling portion 211 may have a shape that is closer to the center line of the mounting bracket 200 along a direction in which the mounting bracket 200 is inserted into the mounting portion 340. When the direction, in which the mounting bracket 200 is inserted into the mounting portion 340, is the vertical direction, the side surface of the display coupling portion 211 may have a shape that is closer to the center line of the mounting bracket 200 from the top to the bottom of the mounting bracket 200.

Similarly, the mounting opening 341 may be provided in such a way that a portion of the mounting opening 341 in contact with the inclined side surface of the front support portion 212 has an inclination corresponding to an inclination of the side surface of the front support portion 212. The mounting opening 341 may include an inclined portion to have a shape that is closer to the center line of the mounting opening 341 along the direction in which the mounting bracket 200 is inserted into the mounting portion 340. When the direction in which the mounting bracket 200 is inserted into the mounting portion 340 is the vertical direction, left and right portions of the mounting opening 341 may have a shape that is closer to the center line of the mounting opening 341 from the top to the bottom of the wall bracket 300.

Accordingly, when the mounting bracket 200 is mounted on the mounting portion 340, the mounting position of the mounting bracket 200 may be guided by the inclined surface of the mounting opening 341 and the inclined surface of the display coupling portion 211, and the mounting bracket 200 may be inserted into the mounting portion 340.

However, the shape of the mounting opening 341 and the corresponding display coupling portion 211 is not limited thereto and may be formed to have various shapes. For example, the side surface of the mounting opening 341 or the side surface of the display coupling portion 211 may not include an inclined portion, unlike the above-mentioned description.

The wall bracket 300 may include a pressing member 350 provided to press one surface of the mounting bracket 200 mounted on the wall bracket 300. At least a portion of the pressing member 350 may be disposed inside the mounting portion 340, and may interfere with at least one surface of the mounting bracket 200 when the mounting bracket 200 is mounted on the mounting portion 340. Particularly, the pressing member 350 may be provided to press the mounting bracket 200 by interfering (e.g., contacting) with at least one surface of the bracket body 210.

The pressing member 350 may include a contact portion 351 provided to be in contact with the mounting bracket 200 when the mounting bracket 200 is mounted on the mounting portion 340. The contact portion 351 may have a shape that protrudes toward the mounting bracket 200 so as to interfere (e.g., contact) with the mounting bracket 200 when the mounting bracket 200 is mounted on the mounting portion 340.

Accordingly, when the mounting bracket 200 is mounted on the mounting portion 340, the mounting bracket 200 and the protruding shape of the contact portion 351 may come into contact and the mounting bracket 200 may be pressed by the contact portion 351.

The contact portion 351 may be formed on at least a portion of the pressing member 350 located in a direction in which the mounting bracket 200 is mounted on the mounting portion 340. For example, when the mounting bracket 200 is inserted into the mounting portion 340 while moving downward, the contact portion 351 may be formed at a lower portion of the pressing member 350. Accordingly, when the mounting bracket 200 begins to enter the mounting portion 340, the mounting bracket 200 may be easily mounted without interference by the contact portion 351, but after the mounting bracket 200 is mounted on the mounting portion 340 by a predetermined length or more, the mounting bracket 200 may interfere (e.g., contact) with the contact portion 351 and be pressed by the contact portion 351.

However, embodiments of the present disclosure are not limited thereto, and the pressing member 350 may be provided to have various shapes as long as the pressing member 350 is provided to press at least one surface of the mounting bracket 200. Unlike the above-mentioned description, when the pressing member 350 does not include a protruding portion and has a shape that is in contact with at least one surface of the mounting bracket 200 as a whole, that is, when the pressing member 350 has a predetermined elasticity, the pressing member 350 may be provided to press the mounting bracket 200 mounted on the mounting portion 340.

When the mounting bracket 200 is mounted on the mounting portion 340, the pressing member 350 may be disposed at the rear of the mounting bracket 200. That is, the pressing member 350 may press the rear surface of the mounting bracket 200 forward. Particularly, as the pressing member 350 presses the rear surface of the bracket body 210, which is inserted into the mounting portion 340, forward, the front support portion 212 of the bracket body 210 may come into closer contact with the mounting portion forming portion 312.

The pressing member 350 may include an elastic material. For example, the pressing member 350 may include a metal material capable of elastic deformation. However, embodiments of the present disclosure are not limited thereto, and the pressing member 350 may be formed of various materials.

The wall bracket 300 may include a pressing member hole 345 into which an end of the pressing member 350 is inserted when the pressing member 350 is in contact with and interferes with the mounting bracket 200.

As illustrated in FIGS. 7 and 8, when the mounting bracket 200 is pressed by the pressing member 350, the pressing member 350 may also be pressed in the opposite direction by the mounting bracket 200. At this time, at least a portion of the pressing member 350 may be elastically deformed to the opposite side to the mounting bracket 200, and an end of the pressing member 350, which moves in the direction, in which the pressing member 350 is pressed, due to the elastic deformation, may be inserted into a pressing member hole 345.

As illustrated in FIG. 7, when an extent to which the bracket body 210 is inserted into the mounting portion 340 is large, an extent to which the end of the pressing member 350 is inserted into the pressing member hole 345 may be large, and as illustrated in FIG. 8, when the extent to which the bracket body 210 is inserted into the mounting portion 340 is small, the extent to which the end of the pressing member 350 is inserted into the pressing member hole 345 may be small.

As the pressing member 350 presses at least one surface of the mounting bracket 200 mounted on the mounting portion 340 in the mounting portion 340, a coupling force of the mounting bracket 200 may be increased. In other words, the pressing member 350 may improve a mounting force of the mounting bracket 200 with respect to the wall bracket 300, and thus the mounting bracket 200 may be more stably mounted on the wall bracket 300.

However, embodiments of the present disclosure are not limited thereto, and the wall bracket 300 may not include the pressing member 350.

The mounting portion 340 may include a guide member insertion portion 343 provided to allow an insertion portion 530 of a guide member 500 (refer to FIG. 12), which will be described later, to be inserted thereinto. Alternatively, the mounting portion 340 may be provided with a hook groove 344 provided to allow a hook portion 531 of the guide member 500, which will be described later, to be inserted thereinto (refer to FIG. 12). This will be described later.

The mounting bracket 200 may be removably mounted on the wall bracket 300. For example, as illustrated in FIGS. 5 to 8, in the case in which the mounting bracket 200 is provided to be mountable on the wall bracket 300 while moving downward, the mounting bracket 200 may be provided to be separated from the wall bracket 300 while moving upward.

That is, the display module 10 may be removably mounted on the wall 2 by the mounting bracket 200. In the case in which the display module 10 is configured to be mountable on the wall 2 while moving downward, the display module 10 may also be configured to be separated from the wall 2 while moving upward.

However, embodiments of the present disclosure are not limited thereto, and the mounting bracket 200 and the wall bracket 300 may be provided to include various configurations that allow the mounting bracket 200 to be mounted on the wall bracket 300. In other words, the method by which the mounting bracket 200 is mounted on the wall bracket 300 is not limited thereto, and may be provided in various ways.

For example, the mounting bracket 200 may be inserted and mounted on the wall bracket 300 in a direction other than the vertical direction as described above. For example, the mounting portion 340 of the wall bracket 300 may be formed to allow the mounting bracket 200 to be inserted in the horizontal direction, or may be formed to allow the mounting bracket 200 to be inserted backwards.

Instead of the method in which the mounting bracket 200 is inserted into the wall bracket 300, at least one component of the wall bracket 300 may be inserted into the mounting bracket 200 as the mounting bracket 200 is moved, and thus the mounting bracket 200 may be mounted on the wall bracket 300.

The wall bracket 300 may include a front bracket 310 and a rear bracket 320 disposed behind the front bracket 310. The front bracket 310 and the rear bracket 320 may be coupled to each other to form the mounting portion 340, to which the mounting bracket 200 is mountable, between the front bracket 310 and the rear bracket 320, and the front bracket 310 and the rear bracket 320 may form at least a portion of the wall bracket 300.

The front bracket 310 and the rear bracket 320 may be coupled to each other through a bracket coupling portion 330. The bracket coupling portion 330 may be provided in such a way that a hole is formed in at least a portion of the front bracket 310 or the rear bracket 320 and a structure, which is bent to allow at least a portion to be inserted into the hole and couples the front bracket 310 and the rear bracket 320, is provided.

For example, the bracket coupling portion 330 may be provided in a method in which a hole is formed in the front bracket 310, and a portion of the rear bracket 320 is pressed to bend toward the front bracket 310 to correspond to the position of the hole in the front bracket 310, and then the bent portion of the rear bracket 320 is inserted into the hole of the front bracket 310 and coupled thereto. Particularly, the bent portion of the rear bracket 320 may be provided to be in contact with and coupled to an inner circumferential portion of the hole of the front bracket 310. At this time, as for the rear bracket 320, a hole may be formed on an inner side of a portion that is bent during the pressing process.

However, the method of coupling the front bracket 310 and the rear bracket 320 is not limited thereto, and the front bracket 310 and the rear bracket 320 may be coupled to each other in various ways, such as bonding with adhesive or fastening with a fastening member.

The mounting portion 340 may be disposed between the front bracket 310 and the rear bracket 320. Particularly, the front bracket 310 may include the mounting portion forming portion 312 that protrudes toward the opposite side of the wall 2, that is, the opposite side of the rear bracket 320. The mounting portion forming portion 312 may be disposed in front of the rear bracket 320, and the mounting portion 340 corresponding to an accommodating space, to which the mounting bracket 200 is inserted and accommodated, may be formed between the mounting portion forming portion 312 and the rear bracket 320.

Because at least an upper portion of the mounting portion forming portion 312 is spaced apart from the rear bracket 320, the mounting bracket 200 may be vertically mountable on the mounting portion 340 of the wall bracket 300. However, embodiments of the present disclosure are not limited thereto, and the mounting portion forming portion 312 may be formed in various ways according to the direction in which the mounting bracket 200 is inserted into the mounting portion 340.

The mounting portion forming portion 312 may be formed by bending at least a portion of the front bracket 310 through the press processing.

The wall fastening hole 311 may be formed in the front bracket 310. That is, a component that is directly fastened to and supported on the wall 2 by the screw S2 may be the front bracket 310. However, embodiments of the present disclosure are not limited thereto, and the wall fastening hole 311 may be formed in the rear bracket 320, or may be formed in both the front bracket 310 and the rear bracket 320.

The bottom support portion 342 may be formed integrally with the rear bracket 320. The bottom support portion 342 may be formed by pressing and bending a portion of the rear bracket 320 forward. At this time, the bottom support portion 342 may be formed by being bent to allow a front portion thereof to be in contact with the front bracket 310. However, embodiments of the present disclosure are not limited thereto, and the bottom support portion 342 may be formed in various ways. The bottom support portion 342 may be manufactured separately from the rear bracket 320.

The above-described pressing member 350 may be disposed on the rear bracket 320. The pressing member 350 may be coupled to the rear bracket 320 and may be provided to press the mounting bracket 200 mounted on the mounting portion 340 forward. Alternatively, the pressing member 350 may be formed integrally with the rear bracket 320. For example, the pressing member 350 may be manufactured by forming the shape of a protrusion protruding to the front side of the rear bracket 320 when manufacturing the rear bracket 320. Alternatively, the pressing member 350 may be coupled to the front bracket 310 so as to press the mounting bracket 200 backward.

When the pressing member 350 is disposed on the rear bracket 320, the pressing member hole 345 may be formed in the rear bracket 320. However, on the contrary, when the pressing member 350 is disposed on the front bracket 310, the pressing member hole 345 may be formed in the front bracket 310.

The wall bracket 300 may be manufactured in a method in which the front bracket 310 and the rear bracket 320 are separately manufactured and then coupled to each other. Accordingly, it is possible to more easily manufacture the wall bracket 300 including the mounting portion 340 and it is possible to reduce the pressing time and cost.

However, embodiments of the present disclosure are not limited thereto, and the wall bracket 300 may be provided as one piece.

With this configuration, the display apparatus 1 may be provided to allow the display module 10 to be mounted on the wall 2 using the wall mount device 100.

Meanwhile, the wall mount device 100 may include various configurations such as the wall bracket 300 provided on the wall 2 and the mounting bracket 200 provided on the rear surface of the display module 10, and thus an error may occur in the position where the display module 10 is mounted on the wall 2, in a comparative embodiment. For example, in a comparative embodiment, in the process of fastening the wall bracket 300 to the wall 2, errors may occur in the position of the wall bracket 300, and errors may also occur when mounting the mounting bracket 200 to the wall bracket 300. When the mounting bracket 200 or the wall bracket 300 is provided in plurality, as illustrated in FIG. 2, errors may be more likely to occur in a comparative embodiment.

When the positional error occurs, the appearance quality of the display module 10 may deteriorate due to a difficulty such as the display module 10 being out of level.

As illustrated in FIGS. 7 and 8, when the mounting bracket 200 is mounted on the wall bracket 300, the position of the display module 10 may be adjusted by the mounting guide 220.

The mounting guide 220 may be movably supported with respect to the bracket body 210. Particularly, the mounting bracket 200 may be provided to allow the mounting guide 220 to penetrate the bracket body 210. In other words, the mounting bracket 200 may include a penetrating portion 213 (e.g., a hole) provided to allow the mounting guide 220 to penetrate therethrough.

The mounting guide 220 may be provided to be movable along the penetrating portion 213. The mounting guide 220 may be provided to be extendable to the upper side of the display module 10 as illustrated in FIG. 7. However, in a comparative embodiment, when the mounting guide 220 remains in a state of extending to the upper side of the display module 10, the appearance quality of the display module 10 may be deteriorated due to the mounting guide 220 when viewed from the front.

As the mounting guide 220 is provided to be movable along the penetrating portion 213, the mounting guide 220 may move to a lower position than the position in FIG. 7, and accordingly, the upper end of the mounting guide 220 may move to a position lower than the upper end of the display module 10. That is, the mounting guide 220 may be hidden by the display module 10 when viewed from the front side of the display module 10 (refer to FIG. 8).

Further, the penetrating portion 213 may be provided to penetrate both surfaces of the bracket body 210 that face away from each other. Particularly, the penetrating portion 213 may be formed to vertically penetrate the bracket body 210, that is, the penetrating portion 213 may be formed to connect and penetrate between upper and lower surfaces of the bracket body 210.

In this case, as illustrated in FIG. 8, the mounting guide 220 may move to the lower side of the penetrating portion 213. In other words, the lower end of the mounting guide 220 may penetrate a lower portion of the penetrating portion 213.

Accordingly, the mounting guide 220 may be provided to press the wall bracket 300 while moving to the lower side of the display module 10. In other words, the mounting guide 220 penetrating the lower portion of the penetrating portion 213 may press the bottom support portion 342, and the bracket body 210 may move upward, as illustrated in FIG. 8. Because the display module 10 is coupled to the bracket body 210, the display module 10 may move upward together with the bracket body 210. With this configuration, the position of the display module 10 mounted on the wall 2 may be adjusted.

The penetrating portion 213 may extend parallel to an extension direction of the mounting guide 220. When the mounting guide 220 is provided to be extendable to the upper side of the display module 10, the penetrating portion 213 may also extend in the vertical direction of the display module 10 to be parallel to the mounting guide 220. Accordingly, the mounting guide 220 may penetrate the penetrating portion 213 with respect to a direction parallel to the extension direction of the mounting guide 220. Further, the mounting guide 220 may move along the penetrating portion 213 in the same direction.

The penetrating portion 213 may be provided in a shape that corresponds to the shape of the mounting guide 220. An inner surface of the penetrating portion 213 may be provided to be in contact with an outer surface of the mounting guide 220.

As the mounting guide 220 and the penetrating portion 213 are coupled to each other, the mounting guide 220 may be provided to be movable along the penetrating portion 213. Particularly, the mounting guide 220 may include a screw thread 221 arranged in a spiral shape along a longitudinal direction of the mounting guide 220 and having a shape that protrudes outward. Correspondingly, the penetrating portion 213 may include a screw groove 213a having a shape corresponding to the screw thread 221.

The mounting guide 220 may easily move along the penetrating portion 213 by the screw thread 221 and the screw groove 213a. A user can finely adjust the position of the mounting guide 220 and can fix the mounting guide 220 to a desired position.

An operating groove 222 provided to manipulate the movement of the mounting guide 220 by being engaged with an end of a fastening tool, such as a screw driver, may be formed on at least one end of the mounting guide 220. The operating groove 222 may be formed concavely from the upper end of the mounting guide 220.

However, the mounting guide 220 and the penetrating portion 213 are not limited to including the screw thread 221 and the screw groove 213a, and may include various configurations to allow the mounting guide 220 to be movably supported on the penetrating portion 213 and to allow the mounting guide 220 and the penetrating portion 213 to be coupled to each other.

The penetrating portion 213 may be formed to accommodate the entire mounting guide 220. Particularly, the penetrating portion 213 may have a length that is longer than or at least equal to the length of the mounting guide 220 to allow the entire mounting guide 220 to be inserted into the penetrating portion 213.

With the above configuration, a user can easily adjust the position of the display module 10 using the mounting guide 220 without separating the mounting bracket 200 and the display module 10 from the wall bracket 300.

Therefore, the mounting guide 220 may also be referred to as a "height adjustment member" or a "position adjustment member."

However, embodiments of the present disclosure are not limited thereto, and the mounting guide 220 may be provided not to perform the function of adjusting the position of the display module 10. The mounting guide 220 may be configured in various ways to be guided by the guide member 500, which will be described later, while extending to the upper side of the display module 10.

Figure 9:
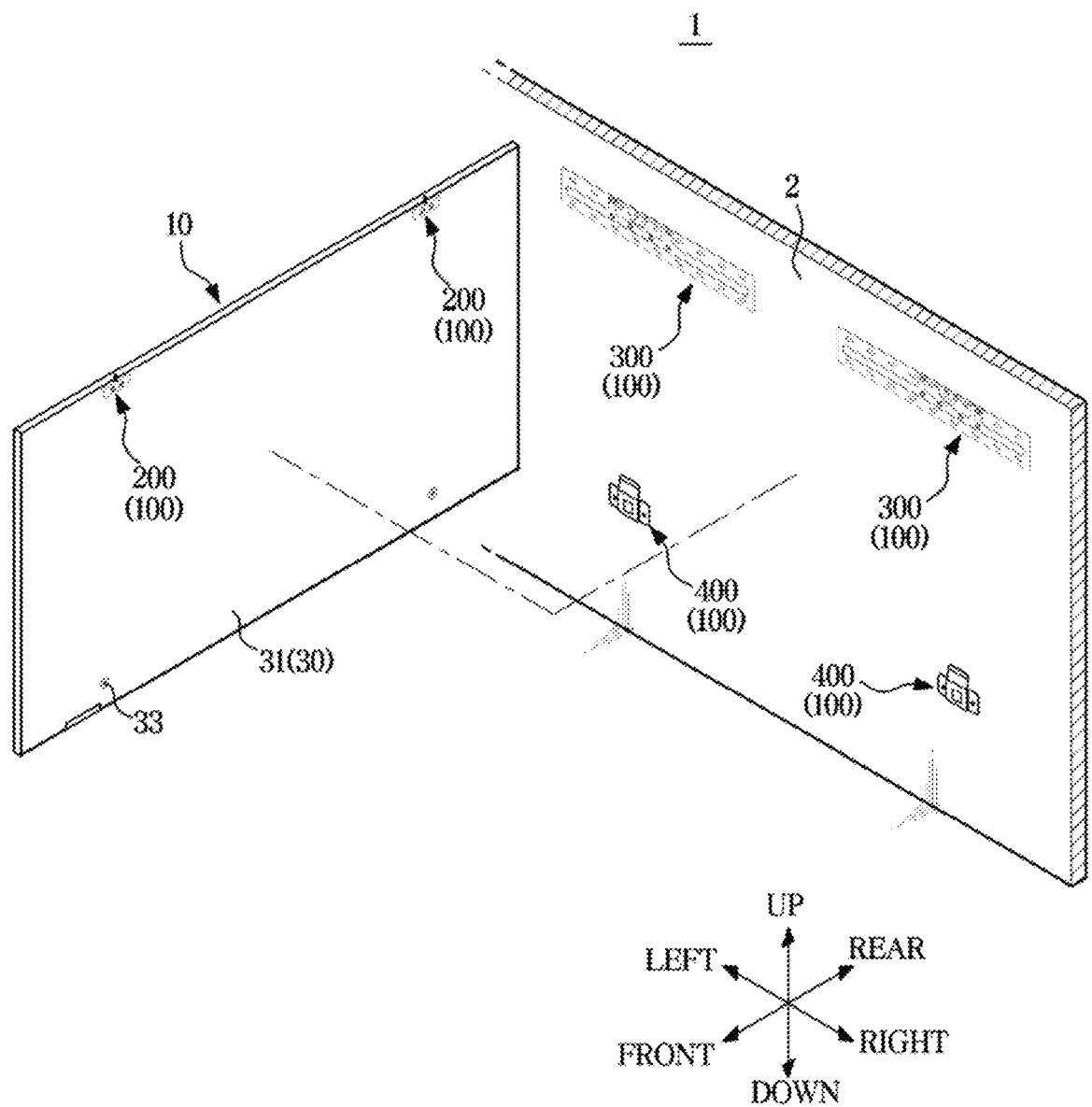
FIG. 9 is a view illustrating a wall mount device according to an embodiment of the present disclosure.
Figure 10:
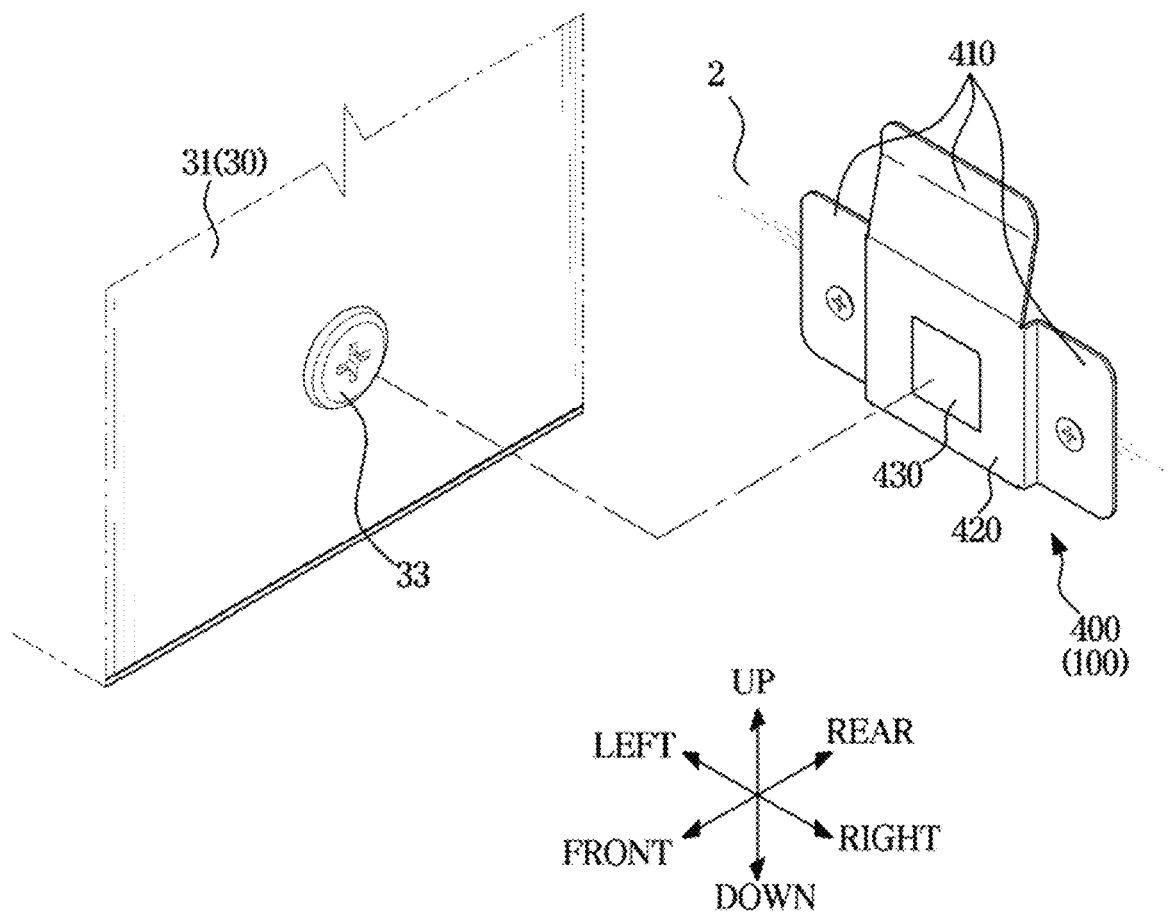
FIG. 10 is a view illustrating a mounting relationship between a sub-wall bracket of FIG. 9 and the display module.
Figure 11:
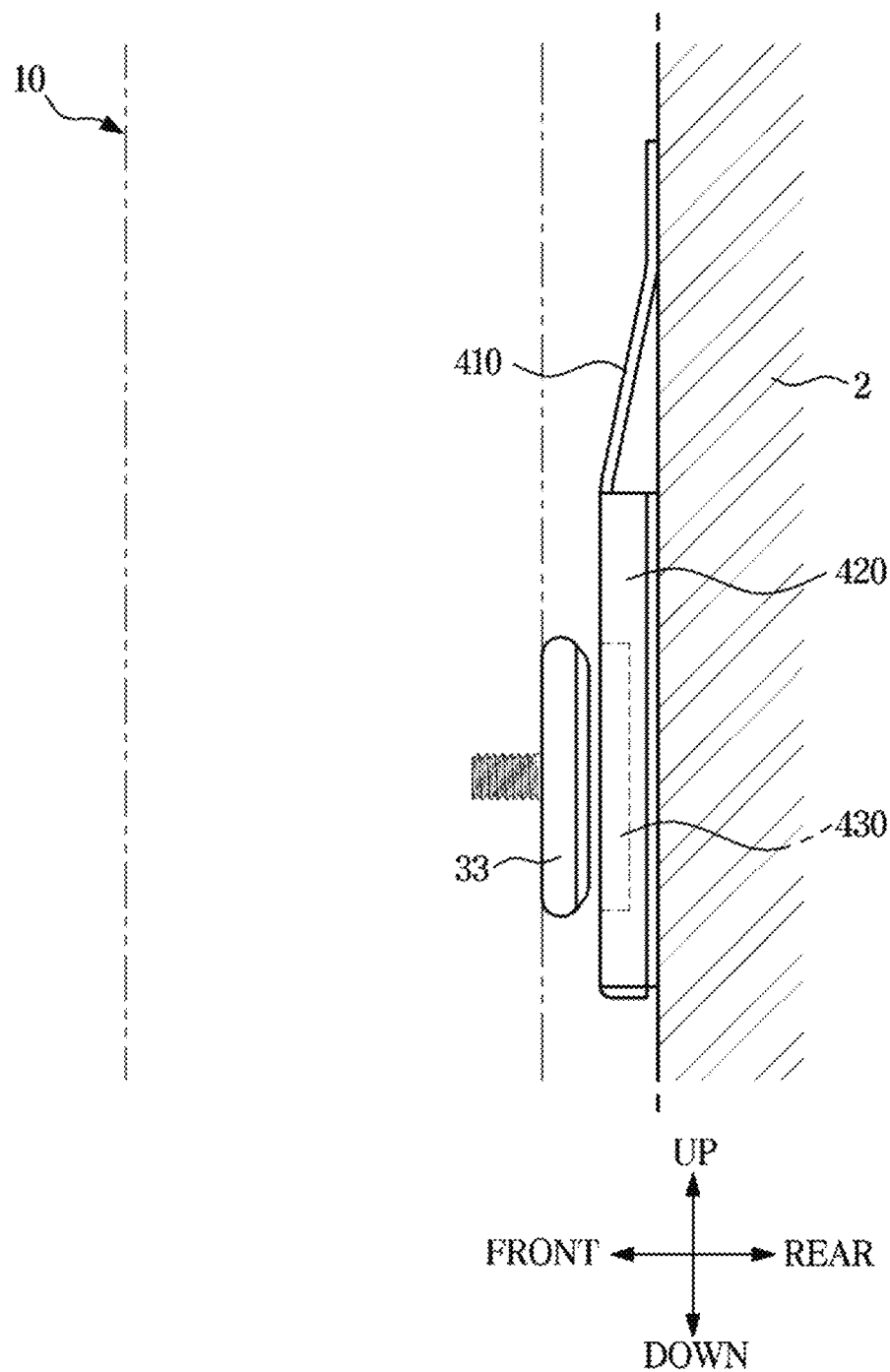
FIG. 11 is a view illustrating a mounting relationship between a sub-wall bracket of FIG. 9 and the display module.

FIG. 9 is a view illustrating a wall mount device according to an embodiment of the present disclosure. FIGS. 10 and 11 are views illustrating a mounting relationship between a sub-wall bracket of FIG. 9 and the display module.

A wall mount device and a display apparatus including the same according to an embodiment of the present disclosure will be described with reference to FIGS. 9 to 11. In describing the embodiment shown in FIGS. 9 to 11, the same reference numerals may be assigned to the same components as those shown in FIGS. 1 to 8 and a repeated description thereof may be omitted.

Referring to FIGS. 9 to 11, the wall mount device 100 may further include a sub-wall bracket 400. The sub-wall bracket 400 may be provided to allow the display module to be more stably mounted on the wall 2 in addition to the mounting structure that includes the wall bracket 300 and the mounting bracket 200 provided to be mountable on the wall bracket 300.

The sub-wall bracket 400 may be provided on the wall 2. Particularly, the sub-wall bracket 400 may be provided on one surface of the wall 2 facing the rear surface of the display module 10, that is, the rear cover 31, and may be provided to support the rear side of the rear cover 31.

The display module 10 may include a sub-mounting member 33 provided at a position corresponding to the sub-wall bracket 400. The sub-mounting member 33 may be provided on the rear surface of the display module 10 to be coupled to the sub-wall bracket 400.

The sub-wall bracket 400 may be provided to support the lower portion of the display module 10. Correspondingly, the sub-mounting member 33 may be disposed in the lower portion of the display module 10. In this case, the sub-mounting member 33 may be disposed below the mounting bracket 200, and the sub-wall bracket 400 may be disposed below the wall bracket 300. However, embodiments of the present disclosure are not limited thereto, and the sub-wall bracket 400 and the sub-mounting member 33 may be disposed in various positions.

The sub-wall bracket 400 and the sub-mounting member 33 may be provided in corresponding numbers. That is, as illustrated in FIG. 9, when a plurality of sub-wall brackets 400 is provided, a plurality of sub-mounting members 33 may also be provided to have a corresponding number.

However, embodiments of the present disclosure are not limited thereto, and the number of sub-wall brackets 400 and sub-mounting members 33 may vary as long as the display module 10 is provided to be stably supported on the wall 2. For example, a single sub-wall bracket 400 and a single sub-mounting member 33 may be provided, or it is possible to provide more than two sub-wall brackets 400 and sub-mounting members 33, which is the number of mounting brackets 200 or wall brackets 300, as shown in FIG. 2.

In addition, the numbers of sub-wall brackets 400 and sub-mounting members 33 do not necessarily have to correspond to each other. For example, even when a plurality of sub-mounting members 33 is provided, a single sub-wall bracket 400 may be provided. Even in this case, the plurality of sub-mounting members 33 may be all mounted on the single sub-wall bracket 400. Conversely, even when a single sub-mounting member 33 is provided, a plurality of sub-wall brackets 400 may be provided.

When a plurality of sub-mounting members 33 is provided, the plurality of sub-mounting members 33 may be provided at positions, which are symmetrical to each other with respect to the center of the display module 10, on the rear surface of the display module 10, that is, the rear cover 31. However, embodiments of the present disclosure are not limited thereto, and the plurality of sub-mounting members 33 may be arranged in various ways to allow the display module 10 to be stably disposed on the wall 2.

In the same manner as the sub-mounting member 33, when a plurality of sub-wall brackets 400 is provided, the plurality of sub-wall brackets 400 may be provided at positions, which are symmetrical to each other with respect to the center of the display module 10 mounted on the wall 2, on one surface of the wall 2. However, embodiments of the present disclosure are not limited thereto, and the plurality of sub-wall brackets 400 may be arranged in various ways to allow the display module 10 to be stably disposed on the wall 2.

The sub-wall bracket 400 may include a wall support portion 410 to be supported on the wall 2. The wall support portion 410 may be in contact with the wall 2, and at least a portion of the wall support portion 410 may be fastened to the wall 2.

The sub-wall bracket 400 may include a display support portion 420 provided to be in contact with the rear surface of the display module 10 so as to support the display module 10. The display support portion 420 may be provided to have a shape corresponding to the overall rear surface of the case 30, that is, the rear cover 31. For example, the display support portion 420 may have an overall flat plate shape. The display support portion 420 may protrude more toward the display module 10, that is, toward the front, than the wall support portion 410.

The sub-wall bracket 400 may include a magnet 430 having magnetism. Correspondingly, the sub-mounting member 33 may include a magnetic material configured to include a metal material such as iron. That is, the sub-wall bracket 400 and the sub-mounting member 33 may be coupled to each other by the magnetic force.

The magnet 430 may be provided on the display support portion 420. The magnet 430 may be disposed on a front surface of the display support portion 420. However, embodiments of the present disclosure are not limited thereto, and as long as the magnetic force acts between the magnet 430 and the sub-mounting member 33, the magnet 430 may be provided inside the display support portion 420.

As illustrated in FIGS. 9 to 11, the sub-mounting member 33 may have the shape of a bolt. The sub-mounting member 33 may be a configuration that is separately included in the display module 10 to be coupled to the sub-wall bracket 400, but may be a configuration that is required in the process of assembling the case 30 of the display module 10. In this case, the sub-mounting member 33 may function as a bolt for fastening during the assembly process of the display module 10, and at the same time, function as a configuration for mounting the display module 10 to the sub-wall bracket 400.

When the sub-mounting member 33 includes the shape of a bolt, a user can adjust an extent to which the sub-mounting member 33 is fastened to the case 30. For example, the sub-mounting member 33 may move rearward from the case 30 as the extent of fastening becomes small. In this case, the sub-mounting member 33 may press the sub-wall bracket 400, and the sub-wall bracket 400 may also press the sub-mounting member 33 forward as a reaction. At this time, a portion of the display module 10, in which the sub-mounting member 33 is provided (e.g., the lower portion of the display module 10) may move forward. With this configuration, a user can adjust the position of the display module 10.

Because the sub-mounting member 33 is coupled to the sub-wall bracket 400 by the magnetic force generated between the sub-mounting member 33 and the magnet 430, the sub-mounting member 33 may be removably coupled to the sub-wall bracket 400.

Further, in a state of being coupled to the magnet 430, the sub-mounting member 33 may slide on the magnet 430. Accordingly, when adjusting the position of the display module 10 using the mounting guide 220, etc., as described above, the position between the sub-mounting member 33 and the sub-wall bracket 400 may be freely adjusted without a restriction caused by the coupling of the sub-mounting member 33 and the magnet 430.

However, embodiments of the present disclosure are not limited thereto, and the sub-mounting member 33 may include various configurations provided to be coupled to the sub-wall bracket 400. For example, the sub-mounting member 33 may be a metal structure provided at a position corresponding to the position of the magnet 430.

Figure 12:
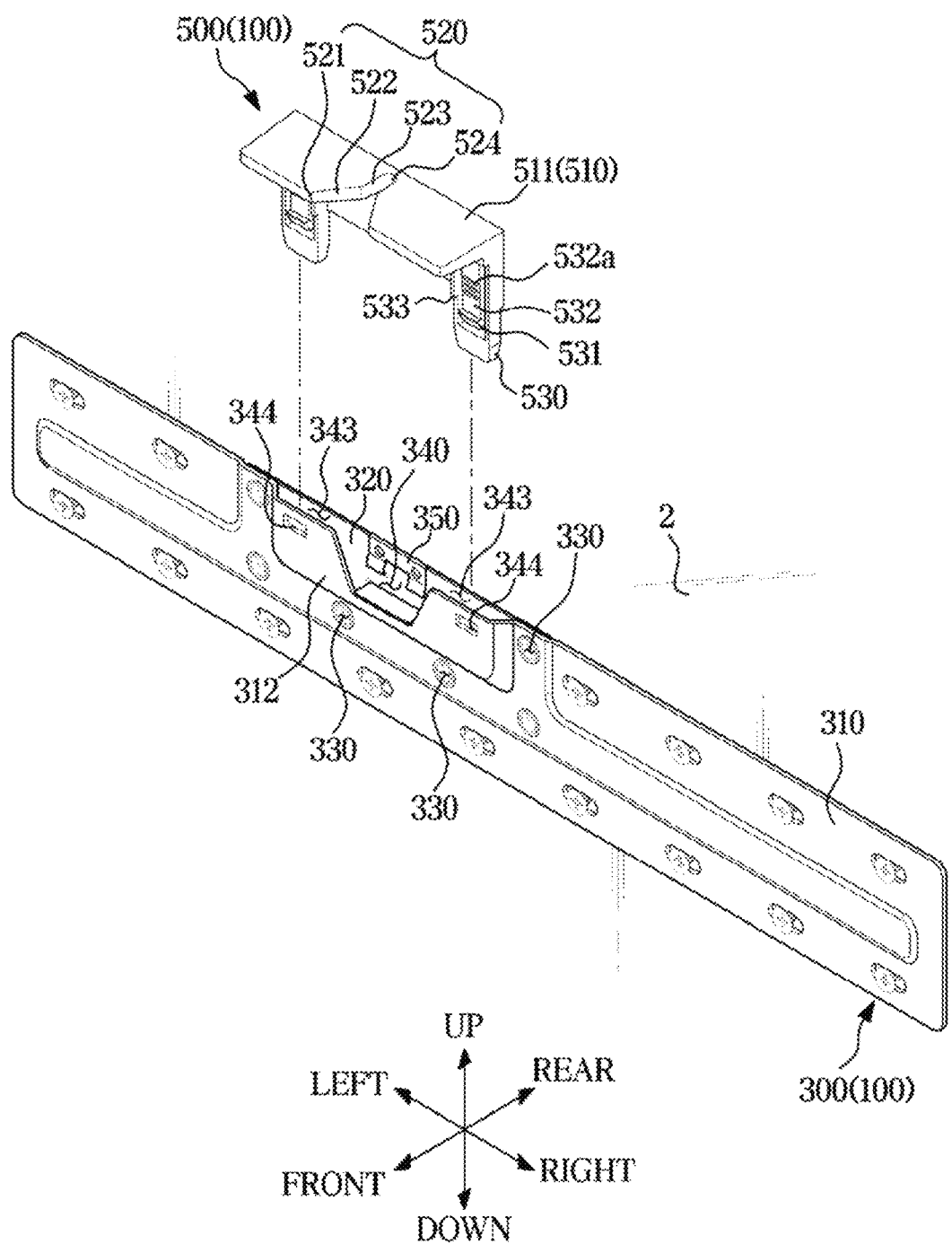
FIG. 12 is a view illustrating a coupling relationship between a guide member and the wall bracket in the wall mount device according to an embodiment of the present disclosure.
Figure 13:
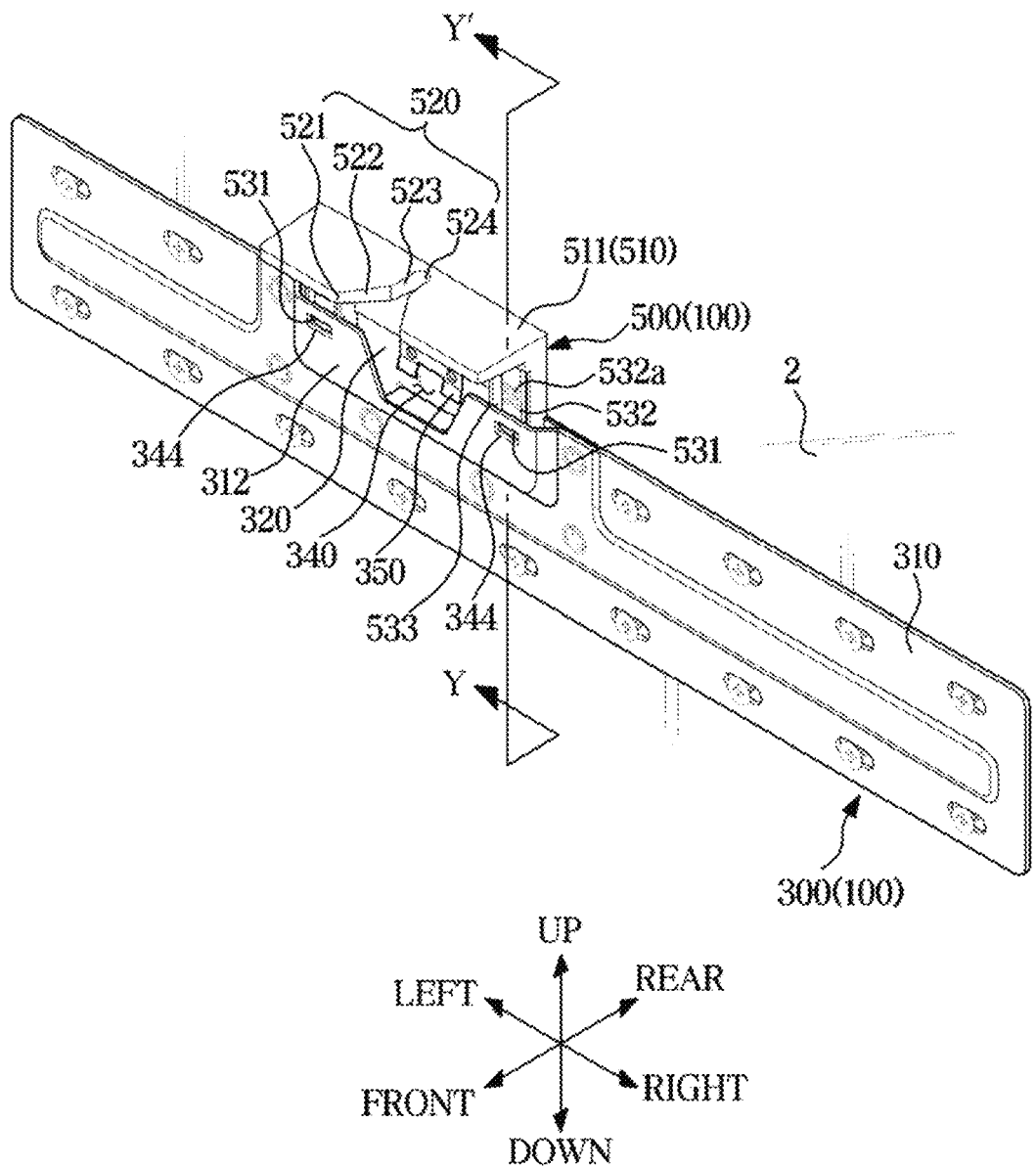
FIG. 13 is a view illustrating a state in which the guide member of FIG. 12 is coupled to the wall bracket.
Figure 14:
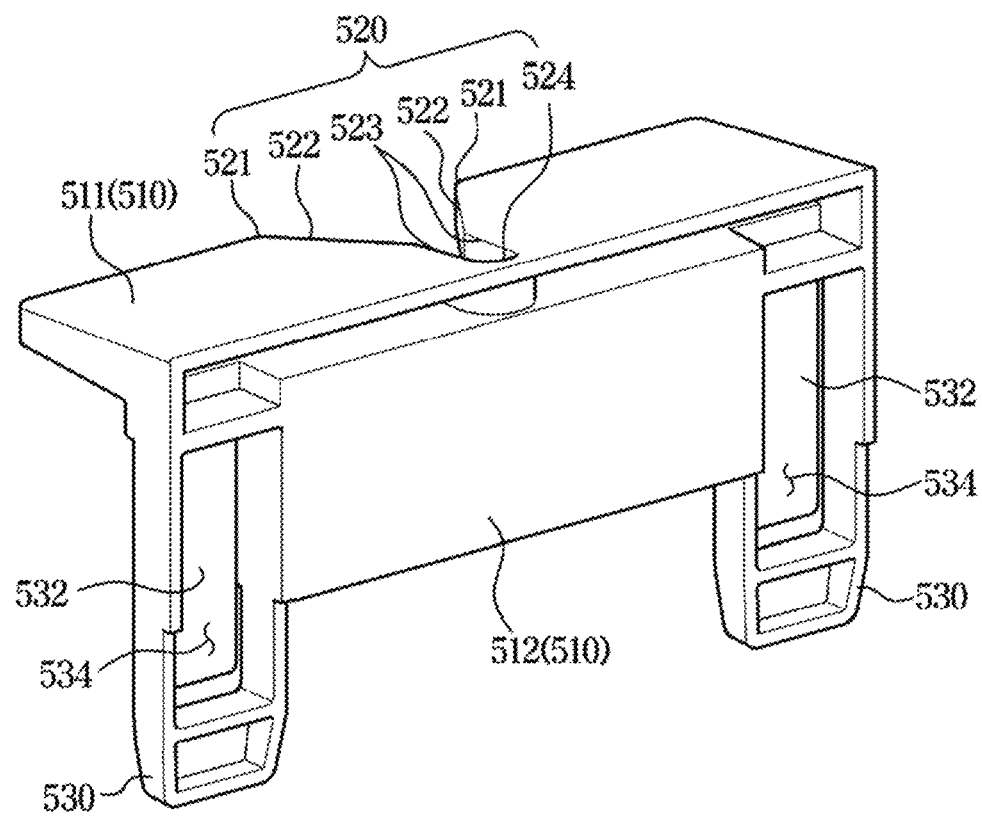
FIG. 14 is a rear-perspective view of the guide member of FIG. 12.
Figure 15:
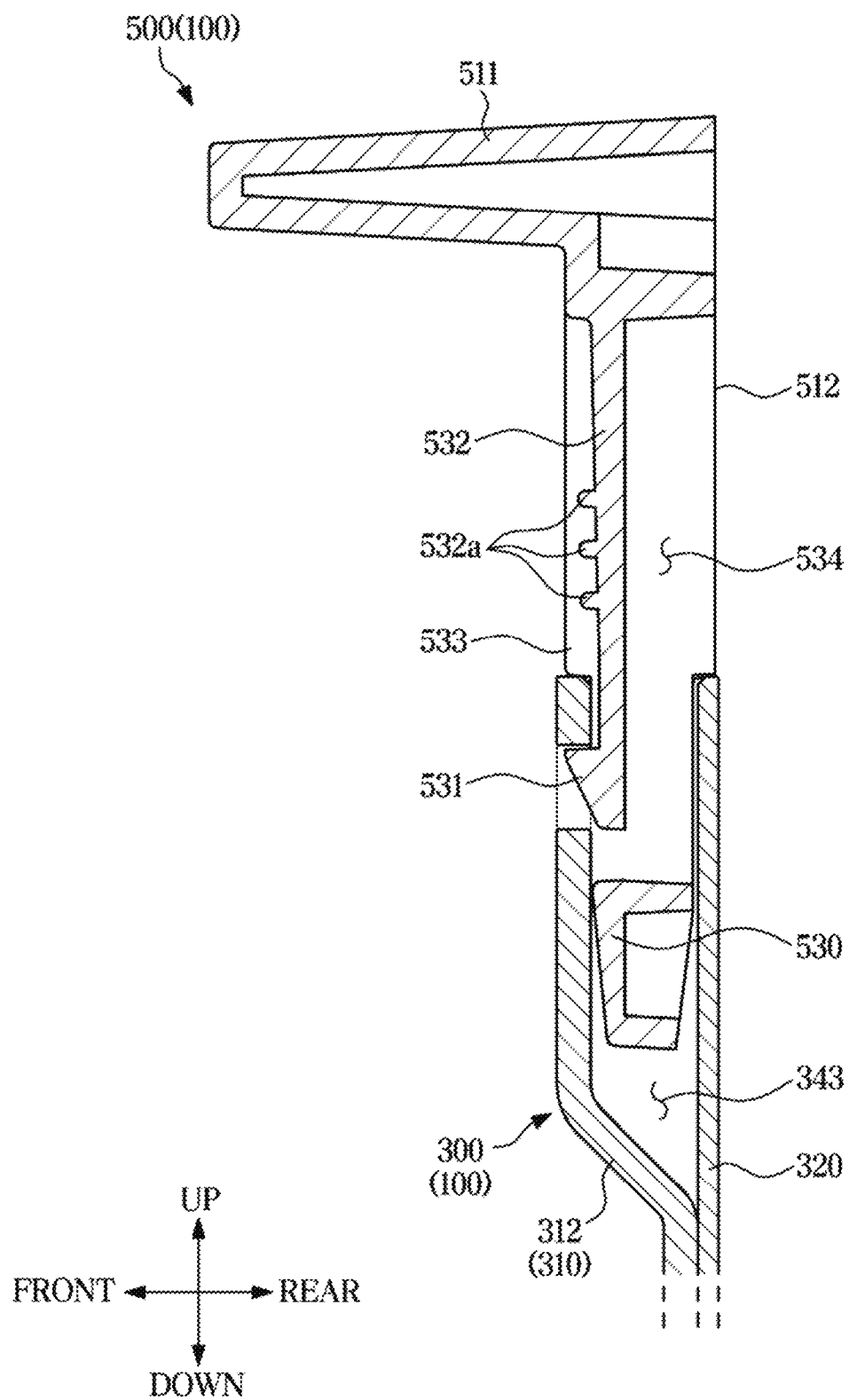
FIG. 15 is a cross-sectional view taken along line Y-Y' of FIG. 13.
Figure 16:
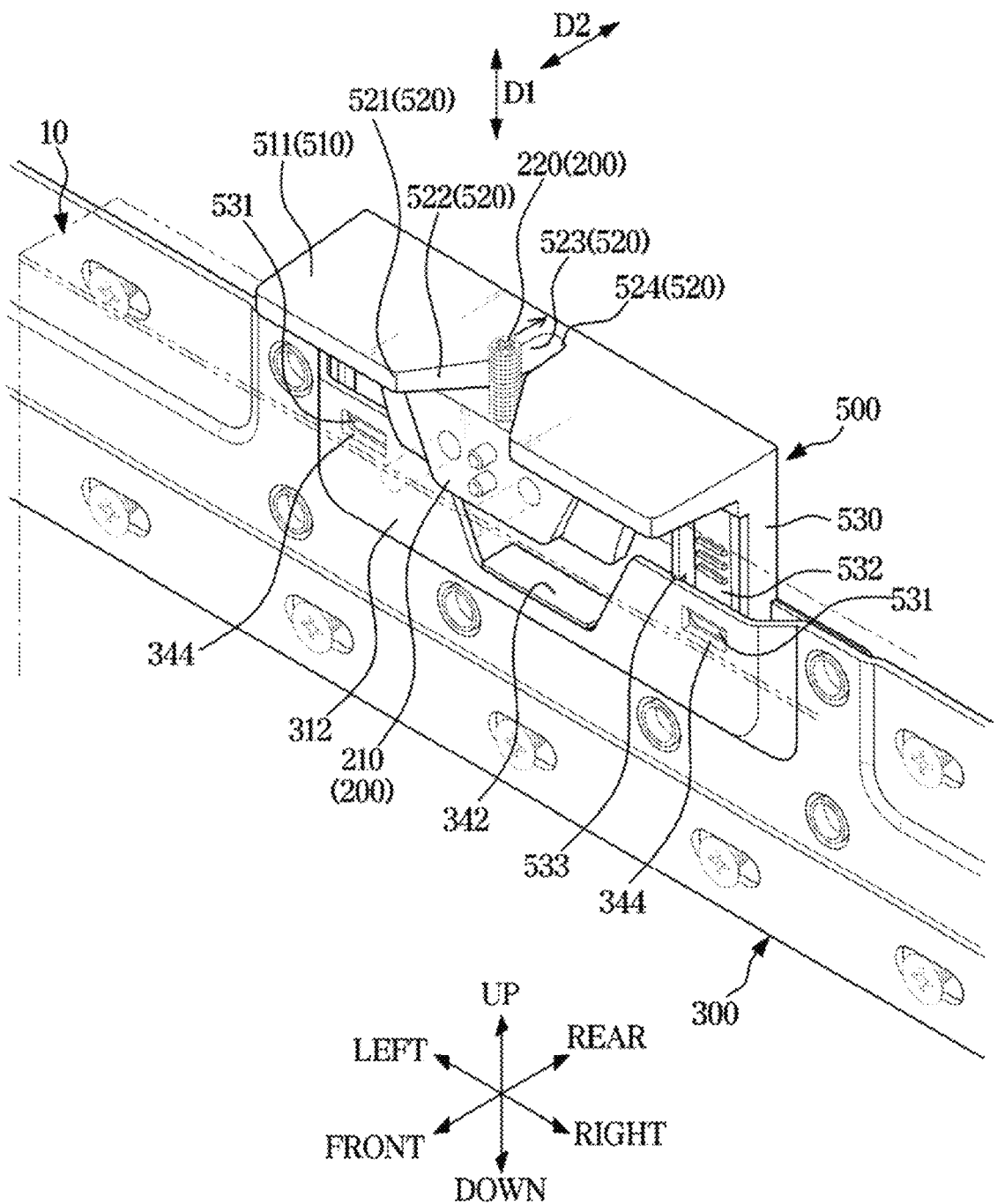
FIG. 16 is a view illustrating a state in which the mounting position of the display module is guided by the guide member in the display apparatus according to an embodiment of the present disclosure.
Figure 17:
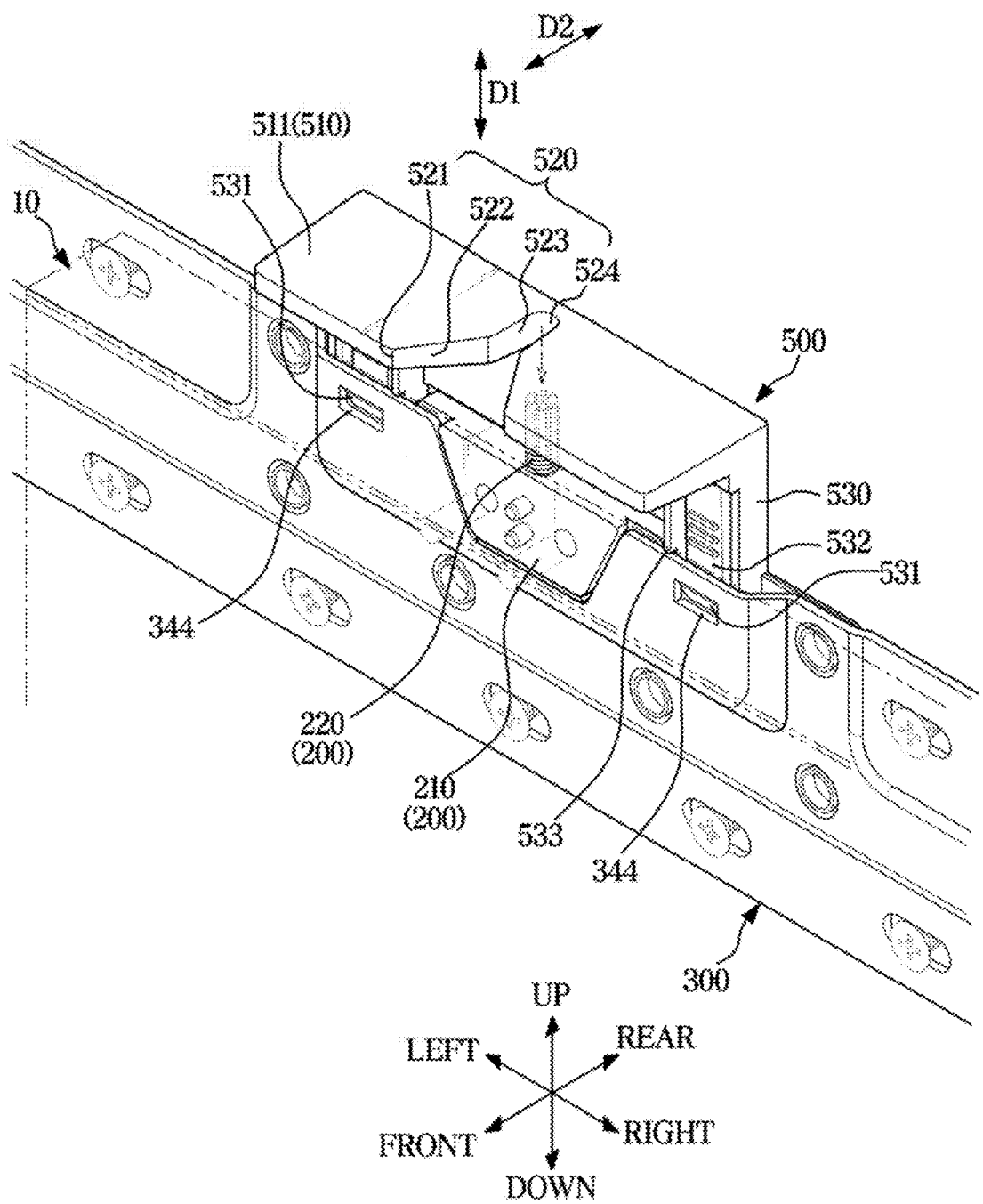
FIG. 17 is a view illustrating a state in which the mounting bracket is mounted on the wall bracket in the display apparatus according to an embodiment of the present disclosure.

FIG. 12 is a view illustrating a coupling relationship between a guide member and the wall bracket in the wall mount device according to an embodiment of the present disclosure. FIG. 13 is a view illustrating a state in which the guide member of FIG. 12 is coupled to the wall bracket. FIG. 14 is a rear-perspective view of the guide member of FIG. 12. FIG. 15 is a cross-sectional view taken along line Y-Y' of FIG. 13. FIG. 16 is a view illustrating a state in which the mounting position of the display module is guided by the guide member in the display apparatus according to an embodiment of the present disclosure. FIG. 17 is a view illustrating a state in which the mounting bracket is mounted on the wall bracket in the display apparatus according to an embodiment of the present disclosure.

In describing the wall mount device and the display apparatus including the same according to the embodiment of FIGS. 12 to 17, a description will be made based on the embodiments shown in FIGS. 1 to 8. However, embodiments of the present disclosure are not limited thereto, and the configuration according to embodiments of the present disclosure is also applicable to the embodiments shown in FIGS. 9 to 11.

Referring to FIGS. 12 to 17, the wall mount device 100 may include a guide member 500 provided to guide the mounting guide 220 when the display module 10 is mounted on the wall 2.

As described above, in order to mount the display module 10 to the wall 2 so as to allow the display module 10 to be supported on the wall 2, the mounting bracket 200 may be provided on the rear surface of the display module 10 and provided to be mountable on the wall bracket 300 provided on the wall 2.

However, according to a comparative embodiment, a gap between the display module 10 and the wall 2 is narrow, and thus when a user mounts the display module 10 to the wall 2, it may be difficult for the user to visually check the position of the mounting bracket 200 or the wall bracket 300.

To relieve the difficulty, when the display module 10 is mounted on the wall 2, the guide member 500 may guide the mounting guide 220, which extends to the upper side of the display module 10, on the upper side of the display module 10. In other words, on the upper side of the case 30, the guide member 500 may be provided to guide at least a portion of the mounting guide 220 extending upward.

The mounting guide 220 may extend to the upper side of the display module 10 and thus a user can view the mounting guide 220 from the front of the display module 10. In addition, on the upper side of the display module 10, the guide member 500 may guide the mounting guide 220 and thus a user can see that the mounting guide 220 is guided by the guide member 500, from the front of the display module 10. That is, due to the mounting guide 220 and the guide member 500, a user can directly or indirectly recognize the position, in which the mounting bracket 200 is mounted on the wall bracket 300, through sight.

The guide member 500 may be provided to be coupled to the wall bracket 300, as illustrated in FIGS. 12 and 13, and provided to guide the mounting guide 220, as illustrated in FIG. 16, so as to allow the mounting bracket 200 to be easily mounted on the wall bracket 300, as illustrated in FIG. 17.

Hereinafter a configuration and function of the guide member 500 will be described in detail.

The guide member 500 may be provided to be coupled to the wall bracket 300. Particularly, the guide member 500 may be coupled to the wall bracket 300 to be positioned in a portion adjacent to the mounting portion 340 the wall bracket 300. However, this does not necessarily mean that the guide member 500 is coupled to the mounting portion 340, and the guide member 500 may be coupled to a position of the wall bracket 300 other than the mounting portion 340. Even in this case, it is appropriate that the guide member 500 is positioned to be adjacent to the mounting portion 340 so as to allow the mounting bracket 200 to be mounted on the mounting portion 340.

The guide member 500 may be provided to be coupled to the wall bracket 300 to allow at least a portion thereof to be positioned on the upper side of the wall bracket 300. Further, the guide member 500 may be provided to be coupled to the wall bracket 300 to allow at least a portion thereof to be positioned on the upper side of the display module 10, that is, above the upper end of the display module 10. Accordingly, on the upper side of the display module 10, the guide member 500 may guide the movement of the mounting guide 220 extending to the upper side of the display module 10.

The guide member 500 may be vertically coupled to the wall bracket 300. Particularly, the guide member 500 may be coupled to the wall bracket 300 in a direction from the top to the bottom of the wall bracket 300. However, embodiments of the present disclosure are not limited thereto, and the guide member 500 may be coupled to the wall bracket 300 in various directions. For example, the guide member 500 may be provided to be coupled to the wall bracket 300 while moving in the horizontal direction.

The guide member 500 may be removably coupled to the wall bracket 300. Accordingly, after the mounting bracket 200 is mounted on the wall bracket 300, a user can separate the guide member 500 from the wall bracket 300.

The guide member 500 may be inserted into and coupled to the wall bracket 300. The guide member 500 may include an insertion portion 530 inserted into the wall bracket 300. As the insertion portion 530 is inserted into the guide member insertion portion 343 formed on the wall bracket 300, the guide member 500 may be coupled to the wall bracket 300. The guide member insertion portion 343 may have a groove shape to allow the insertion portion 530 to be inserted thereinto.

The insertion portion 530 may be formed to extend from a guide body 510, which will be described later, in the direction in which the guide member 500 is inserted into the wall bracket 300. For example, as illustrated in FIGS. 12 to 17, the guide member 500 may be arranged to move downward and be inserted into the wall bracket 300, and the insertion portion 530 may extend downward from the guide body 510.

The guide member 500 may include a hook portion 531 provided to be hooked to the wall bracket 300. The wall bracket 300 may include a hook groove 344 into which the hook portion 531 is inserted. As the hook portion 531 is locked to the hook groove 344, the guide member 500 may be hook-coupled to the wall bracket 300.

The guide member 500 may include a hook connection portion 532 provided to connect the hook portion 531 and the guide body 510. The hook connection portion 532 may be formed to extend from the guide body 510, and the hook portion 531 may be provided at one end of the hook connection portion 532 with respect to the extension direction.

The hook portion 531 and the hook connection portion 532 may be included in the insertion portion 530. That is, at least a portion of the hook portion 531 and the hook connection portion 532 may be provided to be inserted into the guide member insertion portion 343.

The hook portion 531 and the hook connection portion 532 may be disposed in a front portion of the insertion portion 530. At this time, the insertion portion 530 may include a cavity 534 formed at a rear side of the hook portion 531 and the hook connection portion 532. The cavity 534 may be provided in a shape in which a rear portion is open (refer to FIG. 14), but is not limited thereto.

As the cavity 534 is provided in the insertion portion 530, a user can press the hook connection portion 532 toward the cavity 534 to separate the hook portion 531 from the hook groove 344. Accordingly, the hook coupling between the guide member 500 and the wall bracket 300 may be released, and the guide member 500 may be separated from the wall bracket 300. At this time, the hook connection portion 532 may be formed to be elastically deformable as being pressed toward the cavity 534.

The hook connection portion 532 may be provided with a hook pressing portion 532a having a protruding shape to allow a user to easily press the hook connection portion 532.

However, embodiments of the present disclosure are not limited thereto, and the hook portion 531 and the hook connection portion 532 may be configured differently from the insertion portion 530. For example, the guide member 500 may include a configuration that is inserted into the wall bracket 300 and further include a configuration that is distinguished from the inserted configuration and hooked to the wall bracket 300.

The guide member insertion portion 343 may be a configuration included in the mounting portion 340. In other words, the guide member insertion portion 343 may be not distinguished from the mounting portion 340 and may be formed integrally with the mounting portion 340. The guide member insertion portion 343 may be disposed between the mounting portion forming portion 312 and the rear bracket 320. However, embodiments of the present disclosure are not limited thereto, and the mounting portion 340 and the guide member insertion portion 343 may be provided in a partitioned space (refer to FIG. 18).

The insertion portion 530 may be provided in plural. The hook portion 531 and the hook connection portion 532 may also be provided in plural.

The plurality of insertion portions 530 may be provided in positions that are symmetrical to each other, and the plurality of hook portions 531 and hook connection portions 532 may also be provided in positions that are symmetrical to each other.

When the mounting bracket 200 is mounted on the wall bracket 300, the mounting bracket 200 may be disposed between the plurality of insertion portions 530. That is, the mounting bracket 200 may be provided to be mounted between the plurality of insertion portions 530.

However, embodiments of the present disclosure are not limited thereto, and the plurality of insertion portions 530 may not be provided symmetrically to each other, or a single insertion portion 530 may be provided.

Likewise, the plurality of hook portions 531 and hook connection portions 532 may not be provided symmetrically to each other, or a single hook portion 531 and a single hook connection portion 532 may be provided.

Further, in FIGS. 12 to 17, it is illustrated that the number of hook portions 531 and hook connection portions 532 correspond to the number of insertion portions 530, but is not limited thereto.

The guide member 500 may include a wall bracket support portion 533 provided on the upper portion of the insertion portion 530 to allow the guide member 500 to be supported by the wall bracket 300.

When the insertion portion 530 is inserted into the wall bracket 300, the wall bracket support portion 533 may protrude more forward than a portion, in which the insertion portion 530 is inserted into the wall bracket 300, so as to be supported by the upper end of the wall bracket 300. Particularly, the wall bracket support portion 533 may be provided in contact with the upper end of the mounting portion forming portion 312 to allow the guide member 500 to be vertically supported on the wall bracket 300. However, embodiments of the present disclosure are not limited thereto, and the guide member 500 may not be provided with the wall bracket support portion 533.

With this configuration, the guide member 500 may be firmly coupled to the wall bracket 300 and may guide the mounting guide 220 more stably.

However, embodiments of the present disclosure are not limited thereto, and the guide member 500 may be coupled to the wall bracket 300 in various ways. For example, the guide member 500 may be configured to be coupled to the wall bracket 300 by simply being inserted into the wall bracket 300. Alternatively, the guide member 500 may be configured to be coupled to the wall bracket 300 only by being hooked without being inserted into the wall bracket 300. Further, the guide member 500 may not necessarily be separable from the wall bracket 300.

The guide member 500 may include a guide groove 520 into which the mounting guide 220 is inserted and guided. In other words, when the mounting bracket 200 is mounted on the wall bracket 300, the mounting guide 220 extending to the upper side of the display module 10 may be inserted into and guided by the guide groove 520.

In the state in which the mounting bracket 200 is coupled to the display module 10, the mounting bracket 200 may be mounted on the wall bracket 300 coupled to the wall 2. Accordingly, when the mounting bracket 200 is mounted on the wall bracket 300, a process, in which the mounting bracket 200 moves from the front to the rear of the wall bracket 300, may be generally included. At this time, the guide member 500 may be provided to guide the mounting guide 220 to move from the front to the rear of the wall bracket 300.

Particularly, the guide groove 520 may be formed to extend in a direction parallel to the forward and backward directions of the display module 10. In other words, the guide groove 520 may be formed to extend parallel to the direction from the front to the rear of the wall bracket 300. In this case, the mounting guide 220 may move parallel to the forward and backward directions of the display module 10 along the guide groove 520, and the mounting bracket 200 may be provided to be in close contact with the wall bracket 300.

However, embodiments of the present disclosure are not limited thereto, and the direction, in which the mounting guide 220 moves by being guided by the guide member 500, may not be from the front to the rear of the wall bracket 300. The direction in which the mounting guide 220 is guided by the guide member 500 may vary according to the method in which the mounting bracket 200 is mounted on the wall bracket 300.

The guide groove 520 may include an inclined portion 522 in which a width is reduced along a direction in which the mounting guide 220 is guided along the guide groove 520. When the guide groove 520 extends in a direction parallel to the forward and backward directions of the display module 10, the width of the inclined portion 522 in the horizontal directions may be reduced from the front to the rear of the guide groove 520.

The guide groove 520 may not include the inclined portion 522 and the guide groove 520 may be formed to have a constant width and extend only in one direction. In this case, according to a comparative embodiment, when the mounting guide 220 begins to enter the guide groove 520, it may be difficult to align the position of the mounting guide 220. According to a comparative embodiment, when the guide groove 520 has a large width to relieve the difficulty, the mounting guide 220 may not be properly guided by the guide groove 520.

Therefore, when the inclined portion 522 is formed in the guide groove 520, a user can more easily insert the mounting guide 220 into the guide groove 520, and can guide the mounting guide 220 to allow the mounting bracket 200 to be aligned in a more accurate position.

The inclined portion 522 may be formed to extend from an entry portion 521, which is one end of the guide groove 520 through which the mounting guide 220 enters the guide groove 520. The entry portion 521 may generally be located in a front portion of the guide groove 520. In this case, the inclined portion 522 may be formed at the rear of the entry portion 521.

In other words, one end of the inclined portion 522 may be one end of the guide groove 520. However, embodiments of the present disclosure are not limited thereto, and the guide groove 520 may include a portion extending from the entry portion 521 to have a constant width, and the inclined portion 522 may be formed to extend from an end, which is the opposite side to the entry portion 521, of the extending portion. Even in this case, the entry portion 521 may have a sufficient width to allow the mounting guide 220 to be easily inserted, and the mounting guide 220 may be guided by the inclined portion 522 to allow the mounting bracket 200 to be aligned to a more accurate position.

The guide groove 520 may include an extension portion 523 extending from one end of the inclined portion 522 to a direction in which the mounting guide 220 is guided along the guide groove 520, and having a constant width. When the guide groove 520 extends in a direction parallel to the forward and backward directions of the display module 10, the extension portion 523 may extend rearward from one end of the inclined portion 522 and have a constant width.

The guide groove 520 may include a block portion 524 formed to allow one end of the guide groove 520 with respect to the direction, in which the mounting guide 220 is guided, to be blocked. When the mounting guide 220 is inserted into the guide groove 520 and moves along the guide groove 520, the block portion 524 may be provided to stop the movement of the mounting guide 220.

The block portion 524 may be provided parallel to the position of the mounting guide 220 with respect to the vertical direction when the mounting bracket 200 is mounted on the wall bracket 300. In this case, after the movement of the mounting guide 220 is blocked by the block portion 524, the mounting bracket 200 may move downward and be directly mounted on the mounting portion 340 of the wall bracket 300. That is, the block portion 524 may be provided to perform a function of limiting a range in which the mounting guide 220 is guided by the guide groove 520.

The guide groove 520 may be provided on the upper portion of the guide member 500. Particularly, the guide groove 520 may be formed on the guide body 510 formed on the upper portion of the guide member 500, as will be described later.

The guide groove 520 may be formed to be vertically penetrated. In this case, when the mounting guide 220 is guided by the guide groove 520, at least a portion of the mounting guide 220 may be provided to penetrate the guide groove 520.

However, the characteristics of the guide groove 520 are not limited thereto, and may be configured in various ways. For example, the guide groove 520 may not the inclined portion 522, and conversely, the guide groove 520 may include the inclined portion 522 but may exclude the extension portion 523. Alternatively, the guide groove 520 may not include the block portion 524. Alternatively, the guide groove 520 may not have a shape that is vertically penetrated, and may be formed to have a shape in which an upper portion is closed.

The guide member 500 may include the guide body 510 on which the guide groove 520 is provided. The guide body 510 may extend in a direction parallel to the forward and backward directions of the display module 10.

When the guide body 510 is coupled to the wall bracket 300, at least a portion of the guide body 510 may be disposed on the upper side of the wall bracket 300, and further, at least a portion of the guide body 510 may be disposed on the upper side of the display module 10. At this time, the guide groove 520 may be formed in at least a portion of the guide body 510 disposed on the upper side of the display module 10.

When the guide body 510 is coupled to the wall bracket 300, the guide body 510 may extend toward the front of the wall bracket 300 and when the mounting guide 220 is guided by the guide groove 520, the guide body 510 may support at least one surface of the mounting bracket 200.

Particularly, the guide body 510 may include an upper support portion 511 disposed above the bracket body 210 and a rear support portion 512 disposed at the rear of the bracket body 210 when the mounting bracket 200 is mounted on the wall bracket 300. The guide groove 520 may be formed in the upper support portion 511.

The upper support portion 511 may extend in a direction parallel to the forward and backward directions of the display module 10. That is, on the upper side of the wall bracket 300, the upper support portion 511 may extend in the direction parallel to the forward and backward directions of the display module 10 and more particularly, may extend forward toward the display module 10.

When the mounting guide 220 is guided by the guide groove 520, the upper support portion 511 may be provided to support the upper surface of the bracket body 210. Further, the upper support portion 511 may be provided to support the upper surface of the case 30 of the display module 10 when the mounting guide 220 is guided by the guide groove 520.

The rear support portion 512 may be formed to extend downward from a rear end of the upper support portion 511. In other words, the guide body 510 may have an overall bent shape by including the upper support portion 511 and the rear support portion 512

The rear support portion 512 may be provided to be supported by the wall bracket 300. Particularly, the rear support portion 512 may be in contact with an upper end of the wall bracket 300 and be in contact with the wall bracket 300 with respect to the vertical direction.

However, embodiments of the present disclosure are not limited thereto, and the guide body 510 on which the guide groove 520 is formed may be provided to include various configurations.

Hereinafter, the process in which the mounting guide 220 is guided by the guide member 500 will be described in detail with reference to FIGS. 12 to 17.

As illustrated in FIGS. 12 and 13, the guide member 500 may be coupled to the wall bracket 300 coupled to the wall 2.

As illustrated in FIG. 16, the mounting bracket 200 coupled to the display module 10 may approach toward the wall bracket 300. At this time, the mounting guide 220 extending to the upper side of the display module 10 may be inserted into the guide groove 520 of the guide member 500 coupled to the wall bracket 300, and may be guided.

As the mounting guide 220 is guided by the guide member 500, the mounting bracket 200 may be aligned in parallel with a position determined to be mounted on the wall bracket 300. For example, as illustrated in FIG. 16, the mounting guide 220 may be guided parallel to the direction from the front to the rear of the display module 10 by the guide groove 520, and the mounting bracket 200 may move in the direction from the front to the rear of the wall bracket 300. At this time, the mounting guide 220 may be guided to move to a position in which the block portion 524 is located.

As illustrated in FIG. 17, the mounting bracket 200 may move to a predetermined position, and be mounted on the wall bracket 300. Particularly, after the mounting guide 220 is guided by the guide groove 520 so as to allow the mounting bracket 200 to be aligned to be positioned above the mounting portion 340, the mounting bracket 200 may move downward and be inserted into the mounting portion 340.

Meanwhile, as illustrated in FIG. 16, when the mounting guide 220 is guided by the guide groove 520, at least a portion of the mounting guide 220 may be provided to protrude to the upper side of the guide groove 520. Accordingly, a user can more easily check the position of the mounting bracket 200 during the process of mounting the mounting bracket 200 to the wall bracket 300.

After mounting the mounting bracket 200 to the wall bracket 300 is completed, as illustrated in FIG. 17, a user can separate the guide member 500 from the wall bracket 300. Particularly, a user can press the hook pressing portion 532*a* to separate the hook portion 531 from the hook groove 344 so as to release the hook coupling between the guide member 500 and the wall bracket 300, thereby separating the guide member 500 from the wall bracket 300. However, embodiments of the present disclosure are not limited thereto, and as described above, the guide member 500 may be separated from the wall bracket 300 in various ways. Alternatively, the guide member 500 may not be separated from the wall bracket 300.

With this process, a user can easily mount the mounting bracket 200 to the wall bracket 300, and ultimately can easily mount the display module 10 to the wall 2.

However, unlike the above-mentioned description, the mounting guide 220 may extend in a direction other than the upper side of the display module 10. Further, the mounting guide 220 may be guided by the guide groove 520 in a direction other than the upper side of the display module 10.

In other words, the mounting guide 220 may be provided to extend in a first direction D1.

At this time, the guide member 500 may be provided to guide the mounting guide 220, which extends in the first direction D1, to a second direction D2 that is different from the first direction D1. At this time, the guide groove 520 may extend parallel to the second direction D2.

As the mounting guide 220 is guided in the second direction D2 by the guide member 500, the mounting bracket 200 may be positioned in the first direction D1 of the wall bracket 300. That is, the guide member 500 may guide the mounting guide 220 to the second direction D2 so as to perform a function of allowing the mounting bracket 200 to be aligned in the first direction D1 of the mounting portion 340 of the wall bracket 300.

The mounting bracket 200 may be provided to be mounted on the wall bracket 300 with respect to a direction parallel to the first direction D1.

That is, the guide member 500 may guide the mounting guide 220 to the second direction D2 to allow the mounting bracket 200 to be aligned in the first direction D1 of the wall bracket 300, and then may allow the mounting bracket 200 to be mounted on the wall bracket 300 with respect to a direction parallel to the first direction D1, particularly, a direction opposite to the first direction D1.

At this time, the guide member 500 may be provided to guide the mounting guide 220 in the first direction D1 of the display module 10, and the guide groove 520 may be disposed in the first direction D1 of the display module 10.

As illustrated in FIGS. 1 to 17, the first direction D1 may be a direction towards the upper side of the display module 10, and the second direction D2 may be a direction towards the rear side of the display module 10.

However, the first direction D1 and the second direction D2 may be various directions according to the shape or arrangement of the mounting bracket 200, the wall bracket 300, and the guide member 500. The first direction D1 and the second direction D2 may include the vertical direction, the horizontal direction, and forward and backward directions of the display module 10.

Figure 18:
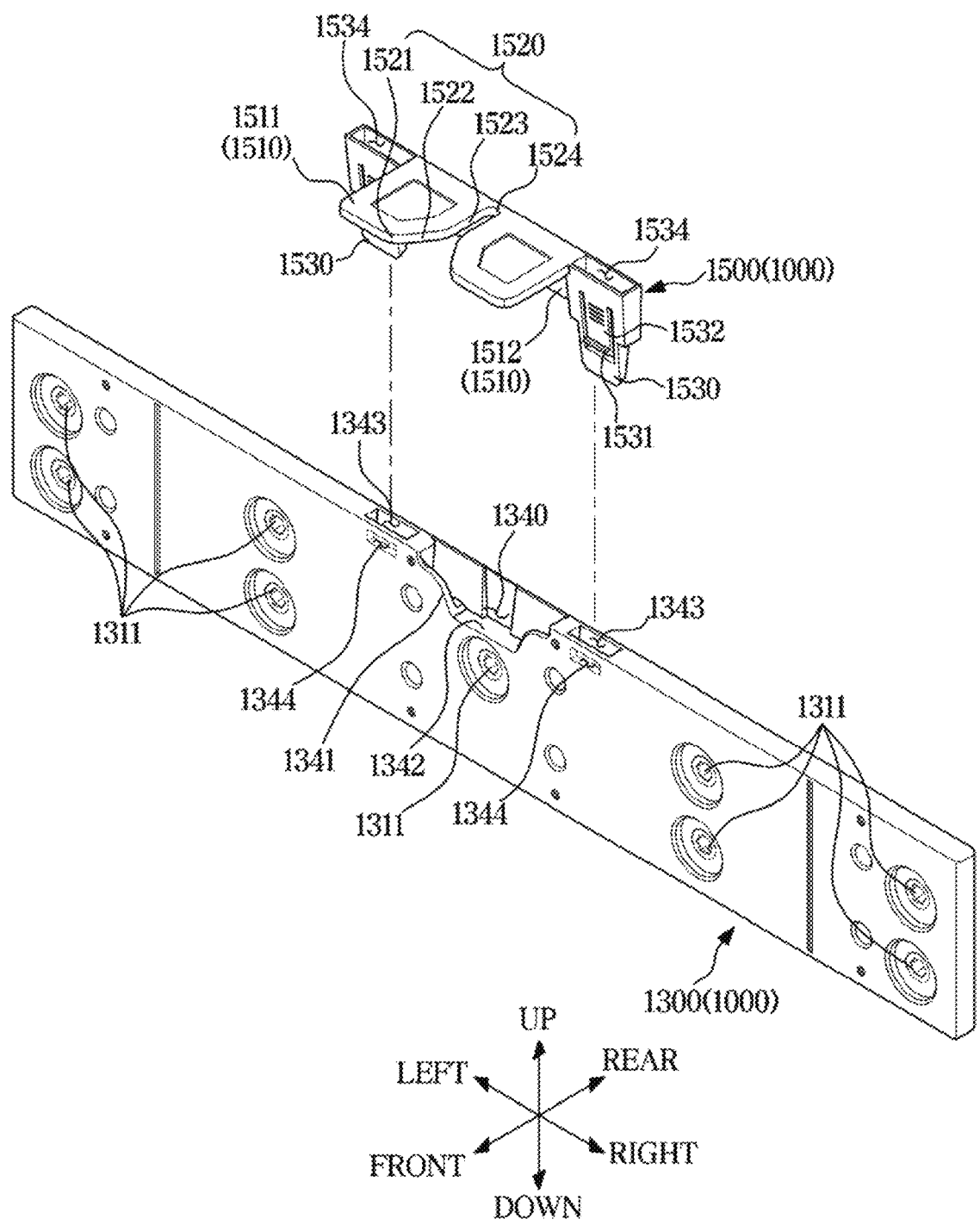
FIG. 18 is a view illustrating a wall bracket and a guide member in a wall mount device according to an embodiment of the present disclosure.

FIG. 18 is a view illustrating a wall bracket and a guide member in a wall mount device according to an embodiment of the present disclosure.

A wall mount device and a display apparatus including the same according to an embodiment of the present disclosure will be described with reference to FIG. 18. In describing the embodiment shown in FIG. 18, the same reference numerals may be assigned to the same components as those shown in FIGS. 1 to 17 and a repeated description thereof may be omitted.

Referring to FIG. 18, a wall mount device 1000 may include a wall bracket 1300 provided on the wall 2.

The wall bracket 1300 may be provided to be fastened to the wall 2 by including a wall fastening hole 1311 through which a fastening member penetrates. The wall fastening hole 1311 may not have a long hole shape, unlike shown in FIGS. 1 to 17.

The wall bracket 1300 may be provided to allow the mounting bracket 200 to be mounted thereon. Particularly, the wall bracket 1300 may include a mounting portion 1340 formed to allow the mounting bracket 200 to be mounted thereon. The mounting portion 1340 may be formed to include a groove shape to allow the mounting bracket 200 to be inserted thereinto.

The mounting portion 1340 may be formed to have a shape, in which an upper portion is open, and thus the mounting bracket 200 may be vertically mounted on the mounting portion 1340.

The wall bracket 1300 may include a mounting opening 1341 formed by opening a front portion of a mounting portion 1320. Accordingly, the mounting bracket 200 may be inserted into the mounting portion 1340 while being coupled to the rear surface of the display module 10.

The wall bracket 1300 may include a bottom support portion 1342 disposed inside the mounting portion 1340 and provided to support a lower end of the mounting bracket 200. The mounting guide 220 may move downward along the penetrating portion 213, and the mounting guide 220 may press the bottom support portion 1342. Accordingly, the position of the display module 10 may be adjusted.

The wall bracket 1300 may include a guide member insertion portion 1343 provided to allow an insertion portion 1530 of a guide member 1500 to be inserted thereinto. Further, the wall bracket 1300 may include a hook groove 1344 into which a hook portion 1531 of the guide member 1500 is inserted.

At this time, unlike the wall bracket 300 shown in FIGS. 1 to 17, the guide member insertion portion 1343 in the wall bracket 1300 shown in FIG. 18 may form a space separated from the mounting portion 1340.

The wall mount device 1000 may include the guide member 1500 provided to guide the mounting guide 220.

The guide member 1500 may be coupled to the wall bracket 1300. Particularly, the guide member 1500 may be removably coupled to the wall bracket 1300 with respect to the vertical direction.

The guide member 1500 may include the insertion portion 1530 provided to be inserted into the wall bracket 1300. The insertion portion 1530 may be provided to extend in the vertical direction. Unlike FIGS. 1 to 17, the insertion portion 1530 may be disposed on a guide body 1510, particularly, an upper support portion 1511.

The guide member 1500 may include the hook portion 1531 provided to be hooked to the hook groove 1344 of the wall bracket 1300 and a hook connection portion 1532 connected to the hook portion 1531. The hook portion 1531 and the hook connection portion 1532 may be a configuration included in the insertion portion 1530, but are not limited thereto.

The guide member 1500 may include a cavity 1534 provided at the rear of the hook portion 1531 and the hook connection portion 1532. Accordingly, a user can easily release the hook coupling between the hook portion 1531 and the hook groove 1344 by pressing the hook connection portion 1532 toward the cavity 1534, and can separate the guide member 1500 from the wall bracket 1300.

At this time, the cavity 1534 may be provided inside the insertion portion 1530. That is, unlike the cavity 534 described in FIGS. 1 to 17, the cavity 1534 shown in FIG. 18 may be formed inside the insertion portion 1530 and may be a space surrounded by an inner wall of the insertion portion 1530.

The guide member 1500 may include a guide groove 1520 provided to allow the mounting guide 220 to be inserted and guided. The guide groove 1520 may be configured to include at least a portion of an entry portion 1521, an inclined portion 1522, an extension portion 1523, and a block portion 1524. The characteristics of the guide groove 1520 are the same as those described in FIGS. 1 to 17.

The guide member 1500 may include the guide body 1510 in which the guide groove 1520 is formed. Particularly, the guide body 1510 may include the upper support portion 1511 provided to support the upper surface of the bracket body 210, and a rear support portion 1512 disposed at the rear of the bracket body 210 when the mounting guide 220 is guided by the guide groove 1520.

The upper support portion 1511 may be provided to extend in the forward and backward directions of the display module 10, and the guide groove 1520 may be provided in the upper support portion 1511.

The rear support portion 1512 may be provided to be in contact with an upper end of the wall bracket 1300 to allow the guide member 1500 to be vertically supported on the wall bracket 1300.

Meanwhile, the wall mount device 100 and the wall mount device 1000 described with reference to FIGS. 1 to 18 are only some of various non-limiting example embodiments of wall mount devices according to embodiments of the present disclosure. Unlike FIGS. 1 to 17 and 18, the wall mount device according to embodiments of the present disclosure may include a wall bracket having the characteristics of the wall bracket 300 described in FIGS. 1 to 17, and a guide member having the characteristics of the guide member 1500 described in FIG. 18. Alternatively, the wall mount device according to embodiments of the present disclosure may include a wall bracket having the characteristics of the wall bracket 1300 described in FIG. 18, and a guide member having the characteristics of the guide member 500 described in FIGS. 1 to 17.

Figure 19:
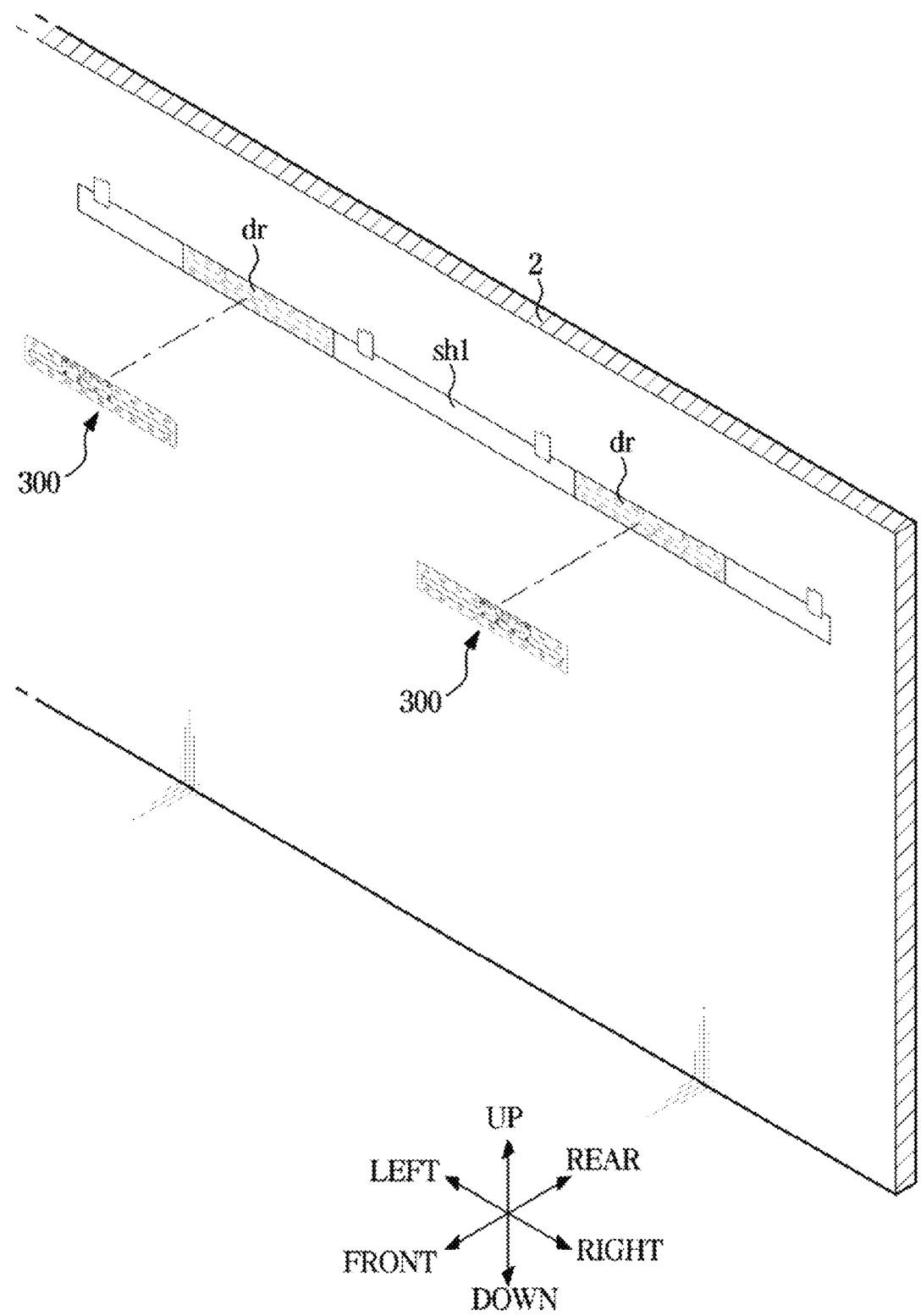
FIG. 19 is a view illustrating a process of coupling the wall bracket to the wall in the wall mount device according to an embodiment of the present disclosure.

FIG. 19 is a view illustrating a process of coupling the wall bracket to the wall in the wall mount device according to an embodiment of the present disclosure.

Referring to FIG. 19, prior to installing the wall mount device 100 according to embodiments of the present disclosure, a sheet sh1 may be attached to the wall 2 provided to support the display module 10. The sheet sh1 may function to guide a position at which the wall bracket 300 is coupled to the wall 2.

The sheet sh1 may include a mark for a designated position in which the wall bracket 300 is to be attached. Particularly, a guide drawing dr that guides the position of the wall bracket 300 may be illustrated on the sheet sh1.

The guide drawing dr may be illustrated to correspond to the size of the wall bracket 300, as illustrated in FIG. 19, and may further be illustrated to correspond to the shape of the wall bracket 300. However, the guide drawing dr is not limited thereto, and may be illustrated in various ways to allow a user to recognize the attachment position of the wall bracket 300.

FIG. 19 illustrates that the guide drawing dr is illustrated on a single sheet sh1, but embodiments of the present disclosure are not limited thereto. Alternatively, a plurality of sheets sh1 may be provided according to the number of guide drawings dr, etc.

The sheet sh1 may be attached to the wall 2 in various ways using adhesive tape or the like.

Hereinafter a method of coupling the wall bracket 300 to the wall 2 according to the embodiment of FIG. 19 will be described in detail.

First, a user can set a position in which the display module 10 is to be mounted on the wall 2. The user can attach the sheet sh1 to the wall 2 according to the mounting position of the display module 10.

After attaching the sheet sh1 to the wall 2, the user can place the wall bracket 300 to a designated position according to the guide drawing dr and then couple the wall bracket 300 to the wall 2. When connecting the wall bracket 300 to the wall 2, the user can use various methods, such as fastening with the screw S2 (refer to FIG. 5).

After the wall bracket 300 is coupled to the wall 2, the user can separate the sheet sh1 from the wall 2 and then install the display module 10.

The sheet sh1 may be provided to include a thin but easily removable material such as paper. For example, when the sheet sh1 is formed of paper material, the user can remove the sheet sh1 from the wall 2 by tearing the sheet sh1. However, embodiments of the present disclosure are not limited thereto, and the sheet sh1 may be composed of various materials.

However, the method of coupling the wall bracket 300 to a designated position on the wall 2 is not limited to the above-mentioned description. The method of coupling the wall bracket 300 to the wall 2 described in FIG. 19 is only an example according to embodiments of the present disclosure, and the wall bracket 300 may be coupled to the wall 2 by various methods.

For convenience of description, FIG. 19 illustrates that the method of coupling the wall bracket 300 according to the embodiment of FIGS. 1 to 17 to the wall 2 is described as an example. However, the sub-wall bracket 400 shown in FIGS. 9 to 11 may be coupled to the wall 2 using the sheet sh1 in the same manner as the wall bracket 300. Further, the wall bracket 1300 according to the embodiment of FIG. 18 may also be coupled to the wall 2 using the sheet sh1.

Figure 20:
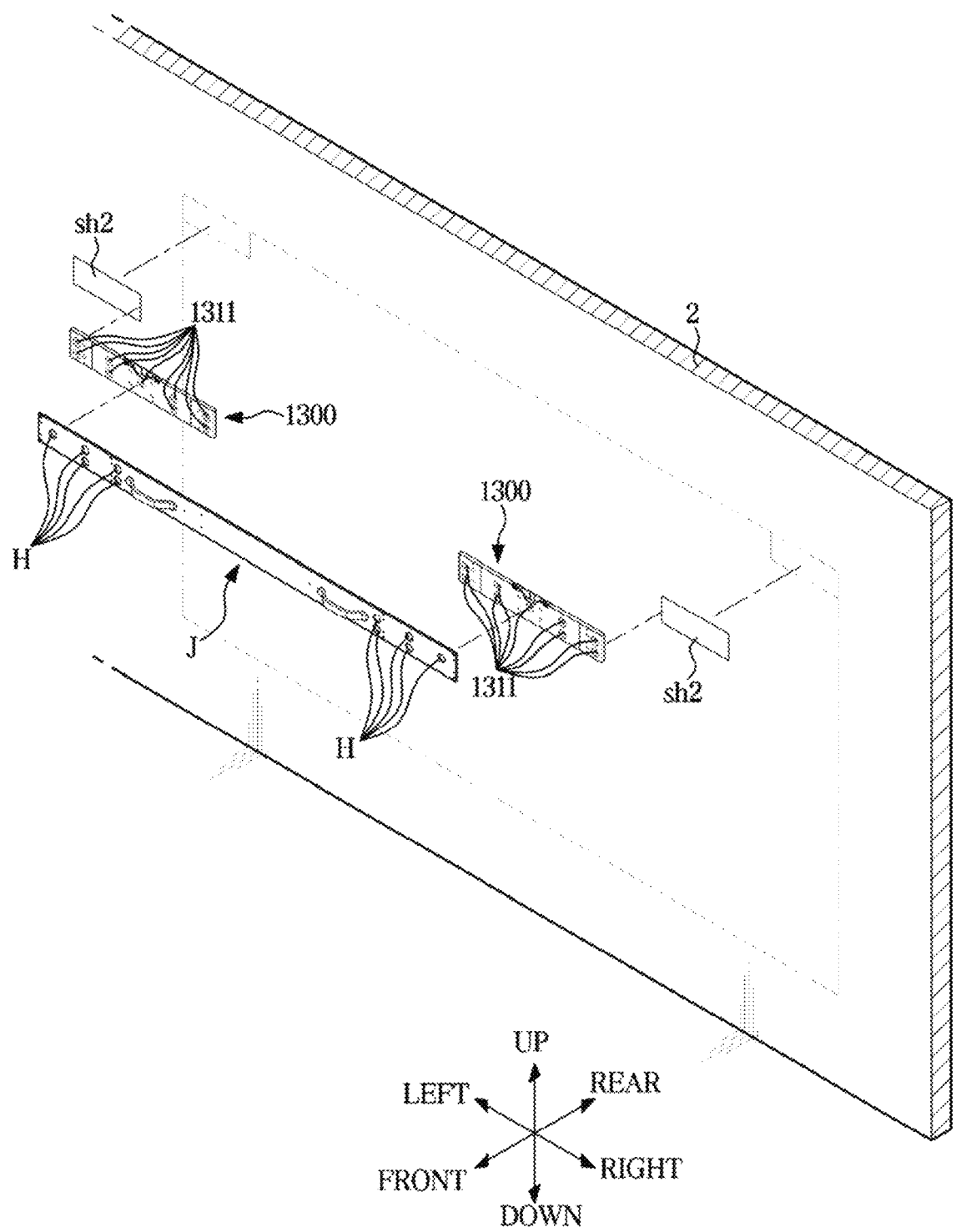
FIG. 20 is a view illustrating a process of coupling a wall bracket to a wall in a wall mount device according to an embodiment of the present disclosure.

FIG. 20 is a view illustrating a process of coupling a wall bracket to a wall in a wall mount device according to an embodiment of the present disclosure.

Referring to FIG. 20, the wall bracket 1300 may be coupled to a designated position on the wall 2 using a jig J.

The jig J may be provided to allow the wall bracket 1300 to be removably coupled. The jig J may include a hole H provided to be penetrated to allow at least a portion of the wall fastening holes 1311 of the wall bracket 1300 to be fastened thereto by a screw.

The hole H may be formed at a designated position on the jig J to allow the wall bracket 1300 to be coupled to the designated position on the wall 2. Further, when a plurality of wall brackets 1300 is provided as illustrated in FIG. 20, the hole H of the jig J may be provided to maintain a distance between the plurality of wall brackets 1300.

However, embodiments of the present disclosure are not limited thereto, and the jig J may include various configurations provided to removably couple the wall bracket 1300 to the jig J.

The jig J may be formed to include a bar shape. Accordingly, a user can couple the wall bracket 1300 to the wall 2 while easily maintaining the horizontality of the wall bracket 1300 using the jig J.

Hereinafter a method of coupling the wall bracket 1300 to the wall 2 according to the embodiment of FIG. 20 will be described in detail.

First, a user can set a position in which the display module 10 is to be mounted on the wall 2. At this time, the user can attach a sheet sh2 to the wall 2 to guide the mounting position of the display module 10. As illustrated in FIG. 20, a plurality of sheets sh2 may be provided, but the sheet is not limited thereto. Alternatively, a single sheet may be provided. Further, the sheet sh2 may be located on a lateral side of the mounting position of the wall bracket 1300 but is not limited thereto.

The user can couple the wall bracket 1300 to the jig J by fastening at least a portion of the hole H of the jig J to the wall fastening hole 1311 of the wall bracket 1300.

The user can place the wall bracket 1300 to a designated position on the wall 2 using the jig J. At this time, the user can more easily place the wall bracket 1300 to the designated position using the sheet sh2.

After the wall bracket 1300 is positioned on the wall 2, the user can fasten the wall bracket 1300 to the wall 2 using a screw or the like. At this time, the wall bracket 1300 may be coupled to the wall 2 by at least a portion of the wall fastening hole 1311 that is not coupled to the hole H of the jig J.

When the wall bracket 1300 is coupled to the wall 2, the user can separate the jig J from the wall bracket 1300 and remove the sheet sh2 from the wall.

The user can completely couple the wall bracket 1300 to the wall 2 using the remaining wall fastening holes 1311 that are not fastened to the wall 2.

However, the method of coupling the wall bracket 1300 to the designated position on the wall 2 is not limited to the above-mentioned description. The method of coupling the wall bracket 1300 to the wall 2 described in FIG. 20 is only an example according to embodiments of the present disclosure, and the wall bracket 1300 may be coupled to the wall 2 by various methods.

In addition, for convenience of description, FIG. 20 illustrates that the method of coupling the wall bracket 1300 according to the embodiment of FIG. 18 to the wall 2 is described as an example, but the wall bracket 300 according to the embodiment of FIGS. 1 to 17 may also be coupled to the wall 2 using the jig J.

While non-limiting example embodiments of the present disclosure have been particularly described with reference to the drawings, it should be understood by those of skilled in the art that various changes in form and details may be made without departing from the spirit and scope of the present disclosure.

What is claimed is:

1. A wall mount device configured to mount a display module, configured to display an image on a front surface of the display module, to a wall, the wall mount device comprising:
   a wall bracket configured to be mounted on the wall;
   a mounting bracket that is mountable on a rear surface of the display module and comprising a mounting guide that extends to an upper side of the display module; and
   a guide member configured to couple to the wall bracket and, in a case where the display module is being mounted on the wall, guide the mounting guide on the upper side of the display module,
   wherein the guide member comprises a guide groove that is configured to receive and guide the mounting guide, and
   wherein the guide groove extends in a direction parallel to forward and backward directions of the display module to guide the mounting guide from the front to the rear of the wall bracket.

2. The wall mount device of claim 1, wherein
at least a portion of the mounting guide protrudes to an upper side of the guide groove in a case where the mounting guide is inserted into the guide groove.

3. The wall mount device of claim 1, wherein
the guide groove comprises an inclined portion comprising a width that reduces in a direction in which the mounting guide is guided by the guide groove.

4. The wall mount device of claim 3, wherein
the guide groove further comprises an extension portion extending from one end of the inclined portion in the direction in which the mounting guide is guided along the guide groove, and the extension portion has a constant width.

5. The wall mount device of claim 3, wherein
the inclined portion extends from one end of the guide groove, the one end of the guide groove configured to receive the mounting guide into the guide groove.

6. The wall mount device of claim 1, wherein
the guide groove further comprises a block portion,
wherein one end of the block portion, with respect to a direction in which the mounting guide is guided by the guide groove, is closed, and
wherein the block portion is configured to, in a case where the mounting bracket is being mounted on the wall bracket, stop movement of the mounting guide in the direction in which the mounting guide is guided.

7. The wall mount device of claim 1, wherein
the wall bracket is configured to receive the mounting bracket therein such that the mounting bracket is mounted to the wall bracket.

8. The wall mount device of claim 1, wherein
the mounting bracket further comprises a penetrating portion through which the mounting guide is configured to penetrate.

9. The wall mount device of claim 8, wherein
the penetrating portion extends parallel to an extension direction of the mounting guide.

10. The wall mount device of claim 8, wherein
the mounting guide is movable within the penetrating portion.

11. The wall mount device of claim 1, wherein
the guide member comprises at least one insertion portion that is configured to be inserted into and coupled to the wall bracket.

12. The wall mount device of claim 11, wherein
the at least one insertion portion is a plurality of insertion portions,
wherein the mounting bracket is configured to be mounted between the plurality of insertion portions.

13. The wall mount device of claim 1, wherein
the wall bracket further comprises a pressing member that is configured to reinforce a coupling force of the mounting bracket by pressing one surface of the mounting bracket mounted on the wall bracket.

14. A display apparatus comprising:
a display module, the display module comprising a display panel configured to display an image on a front side of the display panel, and a case configured to support the display panel; and
a wall mount device configured to mount the display module to a wall,
wherein the wall mount device comprises:
a wall bracket coupled to the wall;
a mounting bracket configured to couple to a rear surface of the case and mountable to the wall bracket, the mounting bracket comprising a mounting guide extendable to an upper side of the case; and
a guide member configured to couple to the wall bracket and configured to guide at least a portion, which extends to the upper side of the case, of the mounting guide, at the upper side of the case, in a case where the display module is mounted on the wall,
wherein the guide member comprises a guide groove on an upper portion of the guide member, the guide groove configured to receive and guide the mounting guide, and
wherein the guide groove extends in a direction parallel to forward and backward directions of the display module to guide the mounting guide from the front to the rear of the wall bracket.

15. The display apparatus of claim 14, wherein
at least a portion of the mounting guide protrudes to an upper side of the guide groove in a case where the mounting guide is being guided by the guide groove.

16. The display apparatus of claim 15, wherein
the guide member further comprises a guide body extending in a direction parallel to forward-backward direction of the display module, and
wherein the guide groove is formed on the guide body.

17. The display apparatus of claim 14, wherein
the mounting bracket further comprises a bracket body configured to couple to the case,
wherein the mounting guide is movably supported by the bracket body, and
wherein the mounting guide is configured to move the bracket body upward in a case where the mounting guide moves to a lower side of the display module and presses the wall bracket.

18. A wall mount device configured to mount a display module to a wall, the wall mount device comprising:
a wall bracket configured to couple to the wall;
a mounting bracket configured to couple to the display module, and mount to the wall bracket in a first direction, the mounting bracket comprising a mounting guide that is extendable in the first direction; and
a guide member configured to couple to the wall bracket, the guide member configured to guide the mounting guide, which extends in the first direction, in a second direction different from the first direction, so as to allow the mounting bracket to be positioned in the first direction with respect to the wall bracket,
wherein the guide member comprises a guide groove on an upper portion of the guide member, the guide groove configured to receive and guide the mounting guide, and
wherein the guide groove extends in a direction parallel to forward and backward directions of the display module to guide the mounting guide from the front to the rear of the wall bracket.

* * * * *